(12) United States Patent
Ainge et al.

(10) Patent No.: US 11,337,353 B2
(45) Date of Patent: May 24, 2022

(54) AGRICULTURAL GROUND ENGAGING CHAIN AND LINK SYSTEM

(71) Applicant: IRON GRIP HOLDINGS PTY LIMITED, Eastern Creek (AU)

(72) Inventors: Stephen Charles Ainge, Eastern Creek (AU); Seyed Ali Heydarshahy, Eastern Creek (AU)

(73) Assignee: IRON GRIP HOLDINGS PTY LIMITED, Eastern Creek (AU)

( * ) Notice: Subject to any disclaimer, the term of this patent is extended or adjusted under 35 U.S.C. 154(b) by 69 days.

(21) Appl. No.: 16/965,858

(22) PCT Filed: Jan. 31, 2019

(86) PCT No.: PCT/AU2019/050068
§ 371 (c)(1),
(2) Date: Jul. 29, 2020

(87) PCT Pub. No.: WO2019/148240
PCT Pub. Date: Aug. 8, 2019

(65) Prior Publication Data
US 2021/0051833 A1 Feb. 25, 2021

(30) Foreign Application Priority Data
Jan. 31, 2018 (AU) .............................. 2018900288

(51) Int. Cl.
*A01B 21/08* (2006.01)
*A01B 23/06* (2006.01)
(52) U.S. Cl.
CPC .............. *A01B 21/08* (2013.01); *A01B 23/06* (2013.01)

(58) Field of Classification Search
CPC ......... A01B 23/06; A01B 23/00; A01B 21/08; A01B 21/00
See application file for complete search history.

(56) References Cited

U.S. PATENT DOCUMENTS 1,832,649 A * 11/1931 Orelind .................. A01B 23/06
172/599
2,797,138 A 6/1957 Lyndhurst
(Continued)

FOREIGN PATENT DOCUMENTS

AU 2007216912 4/2008
BE 889122 12/1981
(Continued)

OTHER PUBLICATIONS

Australian Patent Office, International Search Report and Written Opinion of the International Searching Authority, International Application No. PCT/AU2019/050068, dated Mar. 12, 2019, 10 pages.
(Continued)

*Primary Examiner* — Jessica H Lutz

(57) ABSTRACT

A link assembly (3) and system (203) including a first link portion (7, 207) and a second link portion (9, 209). The first link portion (7, 207) includes a bulbous end (13). The second link portion (9, 209 a socket (15). To link adjacent link assemblies (3) or the first link portion (7, 207) to the second link portion (9, 209), the bulbous end (13) is received in the socket (15). In one example, the link assembly (3) is part of an agricultural ground engaging chain (1) having harrow member portions (5). In other examples, the link assembly and system (203) are used to link first element (204) and second elements (206) to one another. This may be used to join or anchor vehicles, structures and the like.

19 Claims, 29 Drawing Sheets

(56) References Cited

U.S. PATENT DOCUMENTS

| | | | | |
|---|---|---|---|---|
| 2,979,138 A * | 4/1961 | Martensen | A01B 21/08 172/579 |
| 3,562,968 A * | 2/1971 | Johnson et al. | B24B 45/00 451/521 |
| 4,083,413 A * | 4/1978 | Miller | A01B 23/06 172/601 |
| 4,420,048 A * | 12/1983 | Peterson | A01B 23/06 172/568 |
| 4,499,747 A * | 2/1985 | Ewers | A01B 33/024 172/55 |
| 4,577,699 A * | 3/1986 | Rottinghaus | A01B 61/04 172/570 |
| 10,405,472 B2 * | 9/2019 | Ainge | A01B 23/06 |
| 2020/0170166 A1 * | 6/2020 | Paterson | A01B 21/08 |

FOREIGN PATENT DOCUMENTS

| | | |
|---|---|---|
| CN | 1208358 | 2/1999 |
| CN | 201609015 | 12/2009 |
| CN | 102187752 A | 2/2011 |
| EE | 01245 | 10/2014 |
| GB | 859317 | 1/1961 |
| TW | 200911349 A | 9/2007 |
| WO | WO 2015/131246 | 9/2015 |
| WO | WO 2016/201486 | 12/2019 |

OTHER PUBLICATIONS

Chinese Patent Office, Chinese office action dated Mar. 3, 2022, CN2019800100053, Sep. 29, 2021, 9 pages.

* cited by examiner

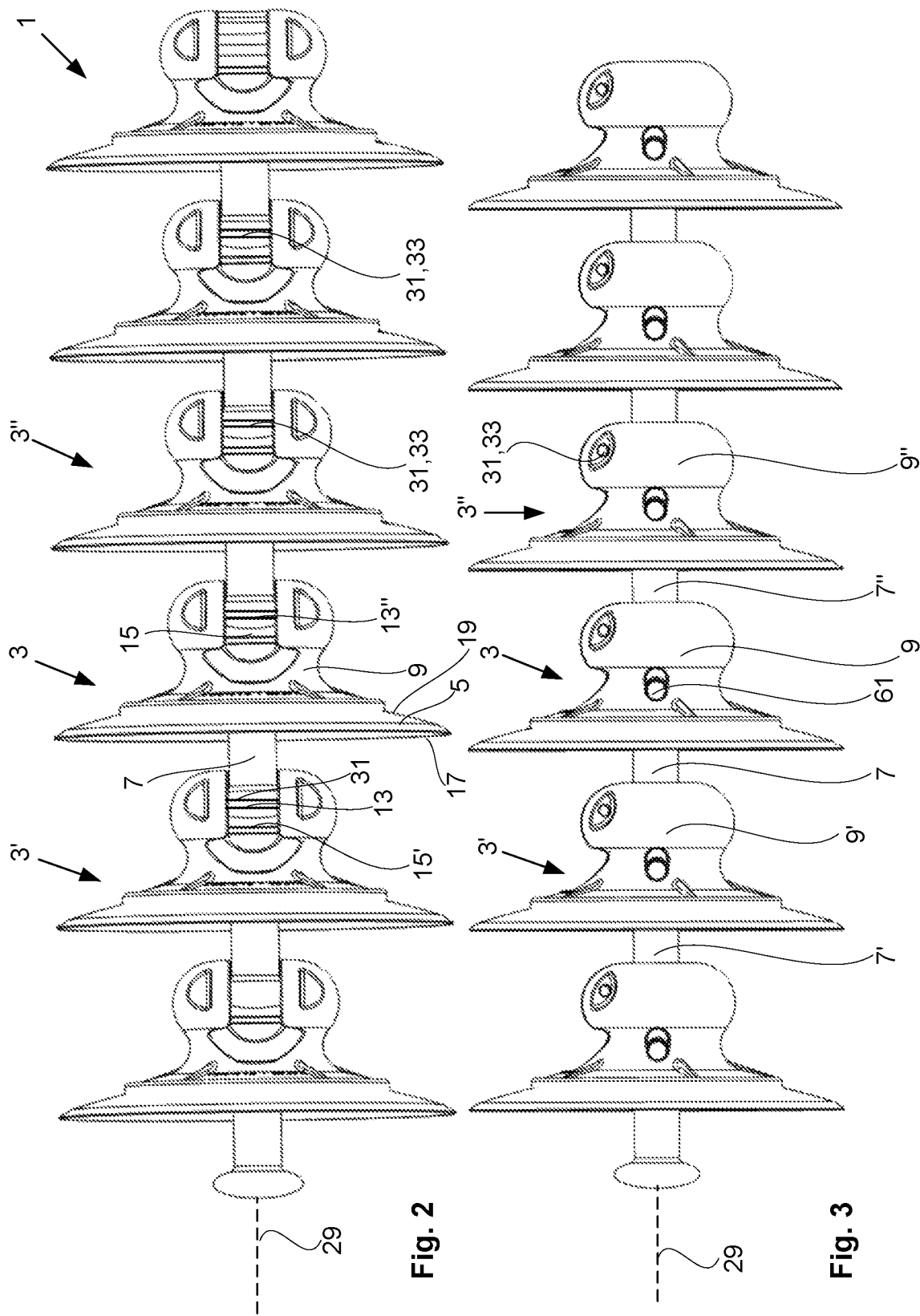

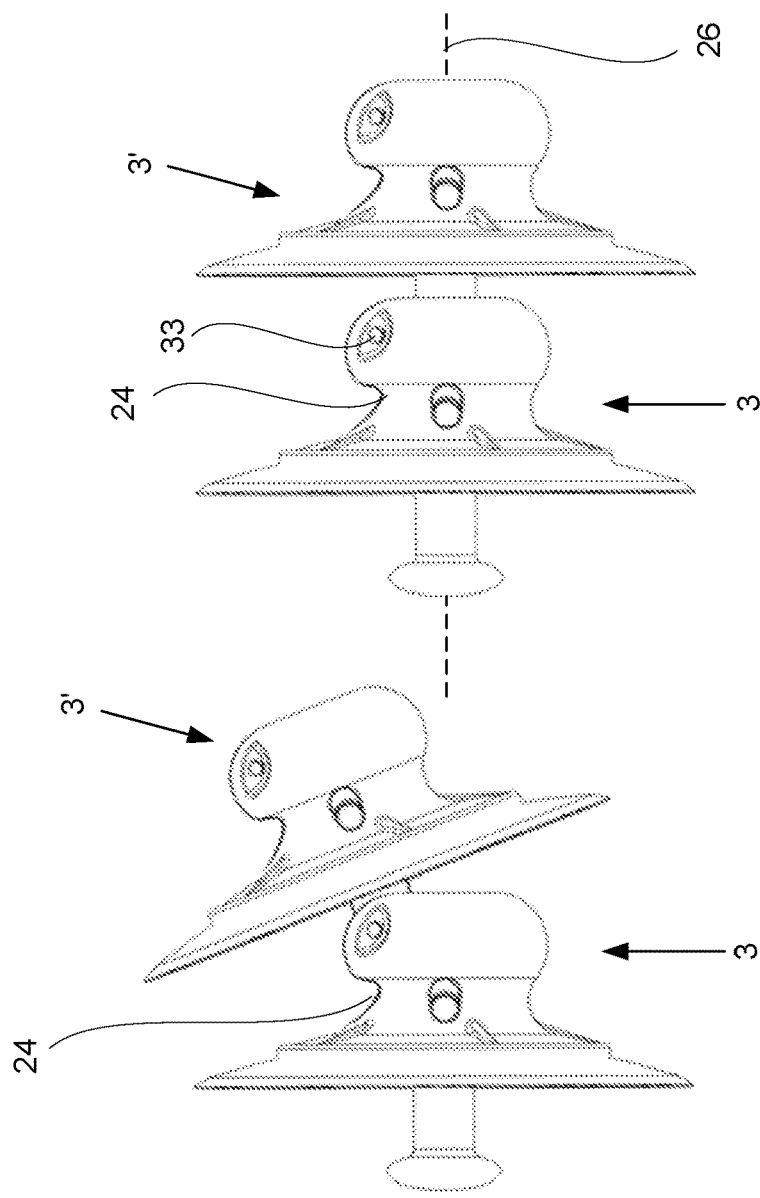

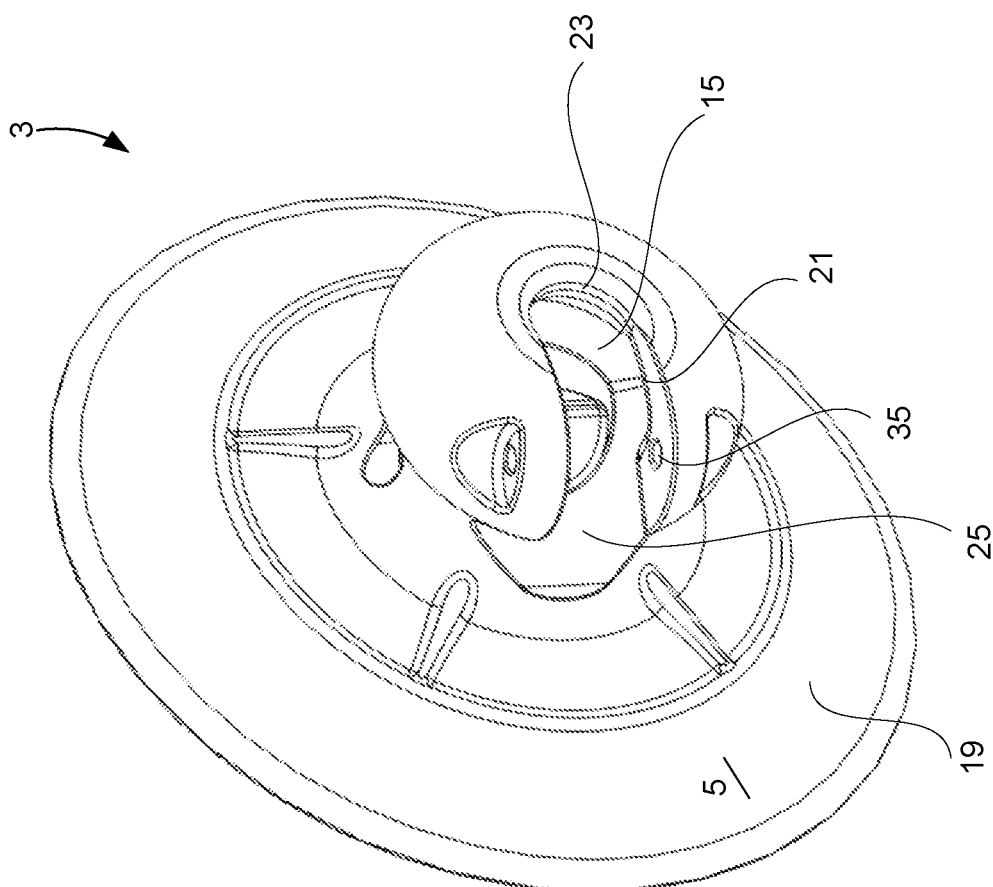
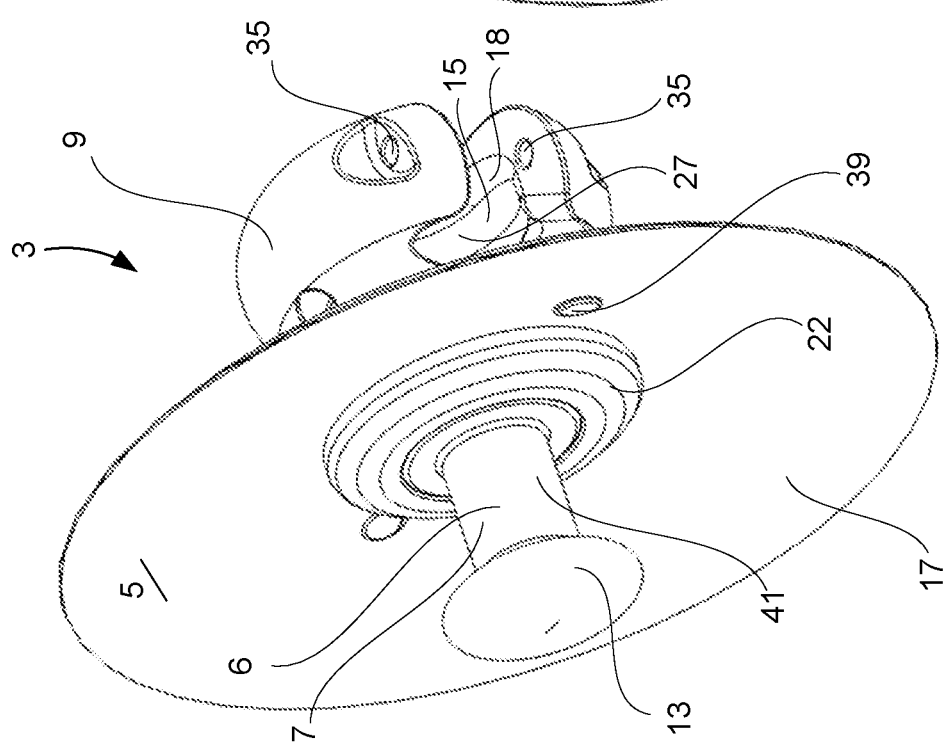

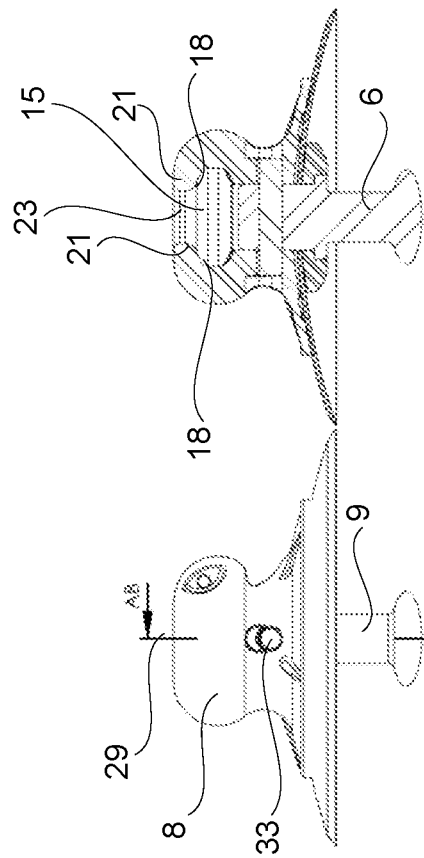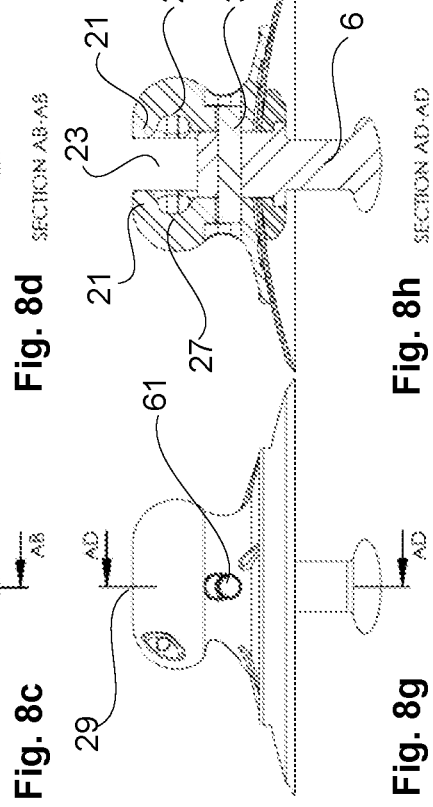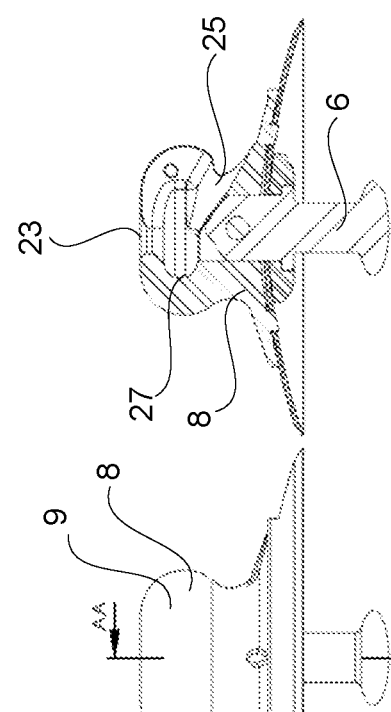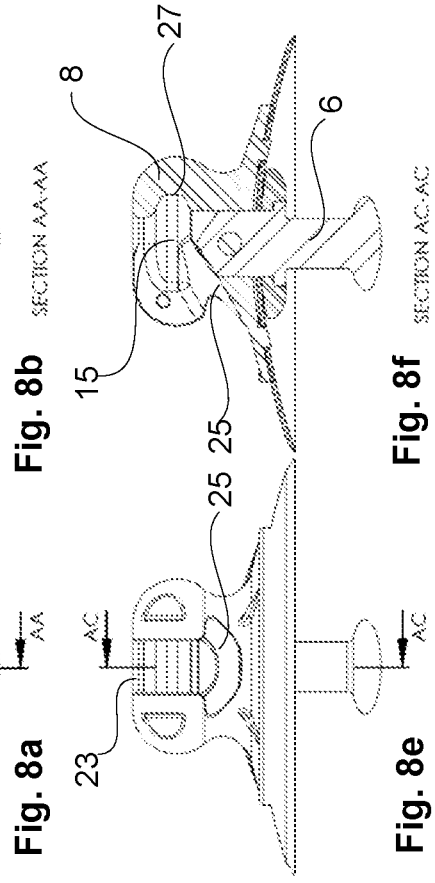

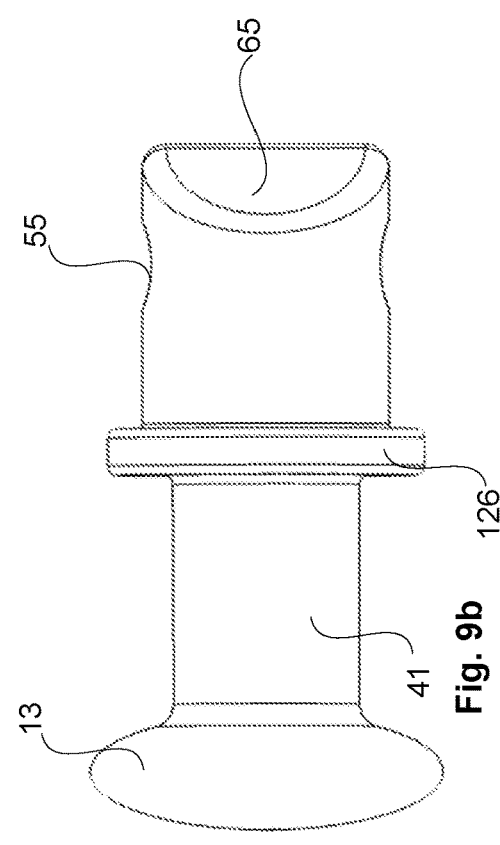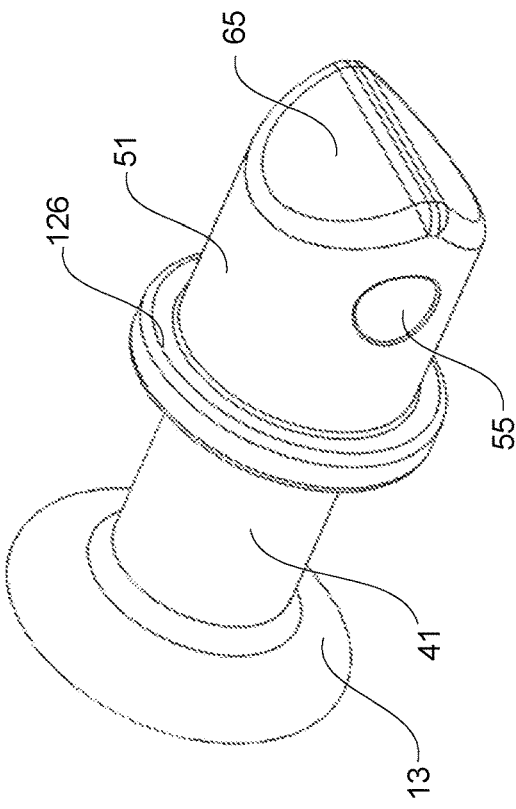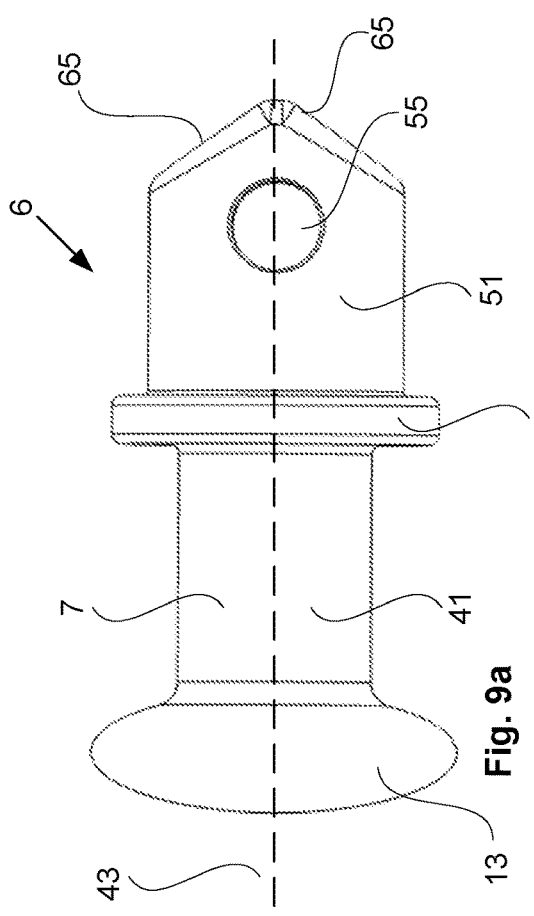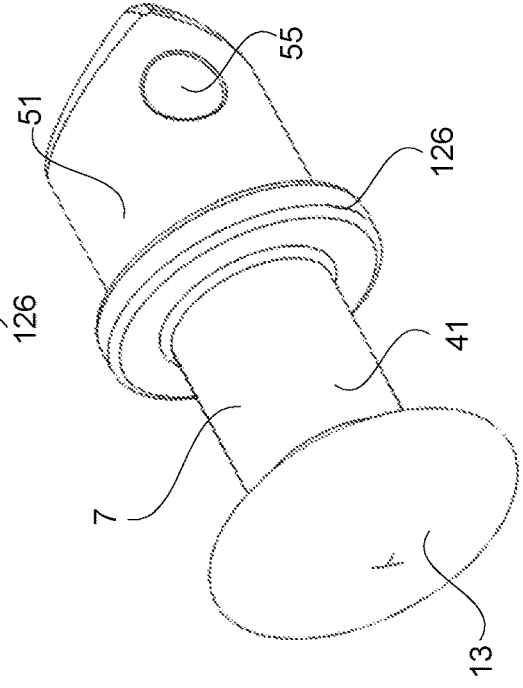

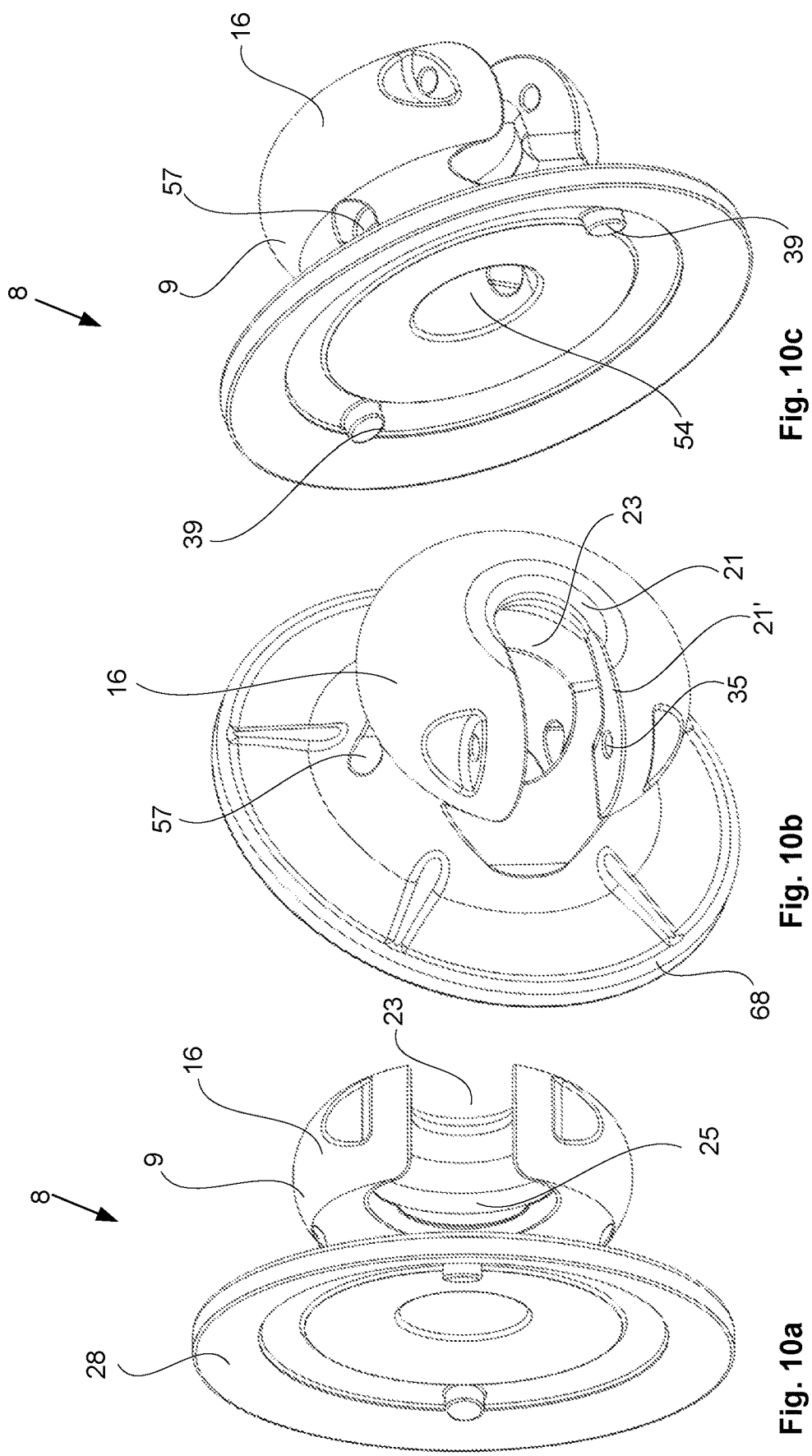

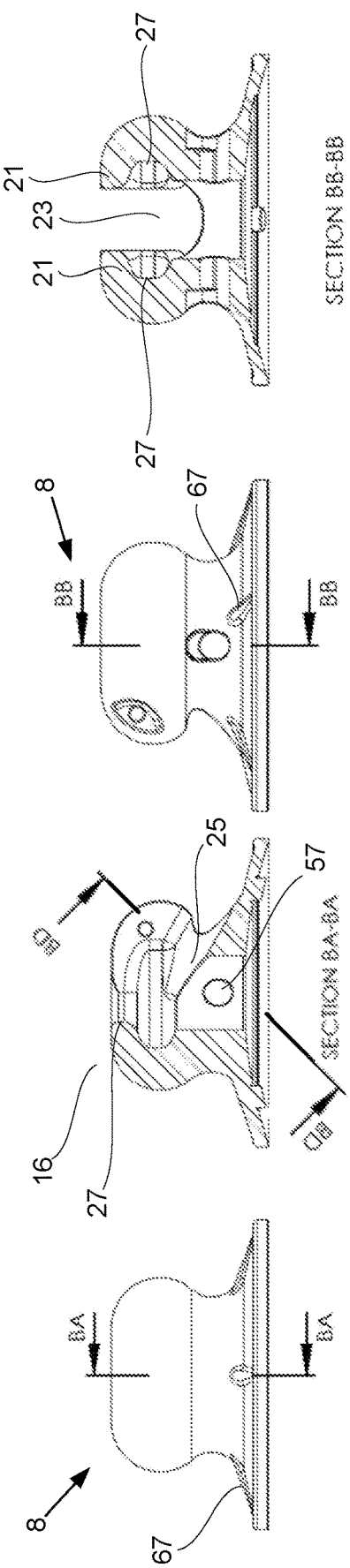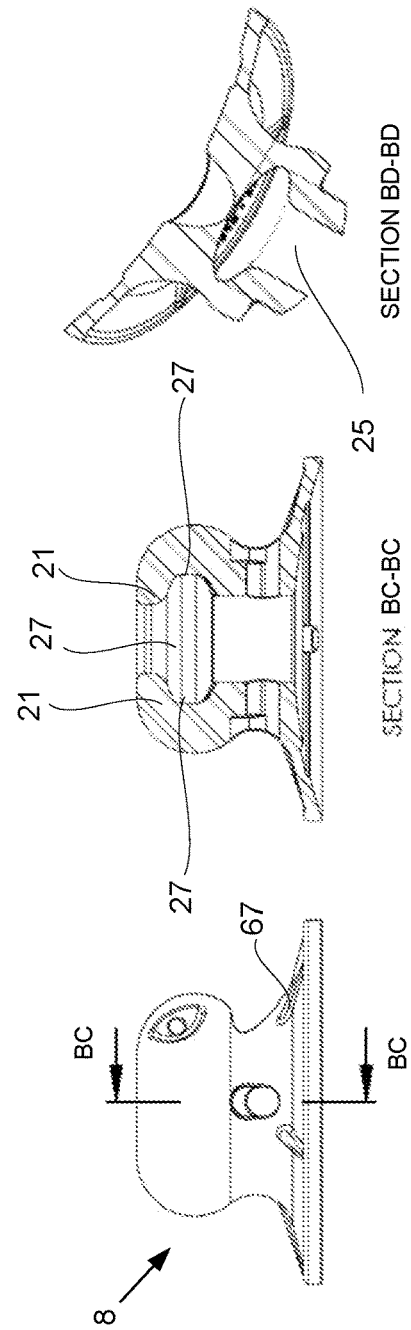

SECTION A-A

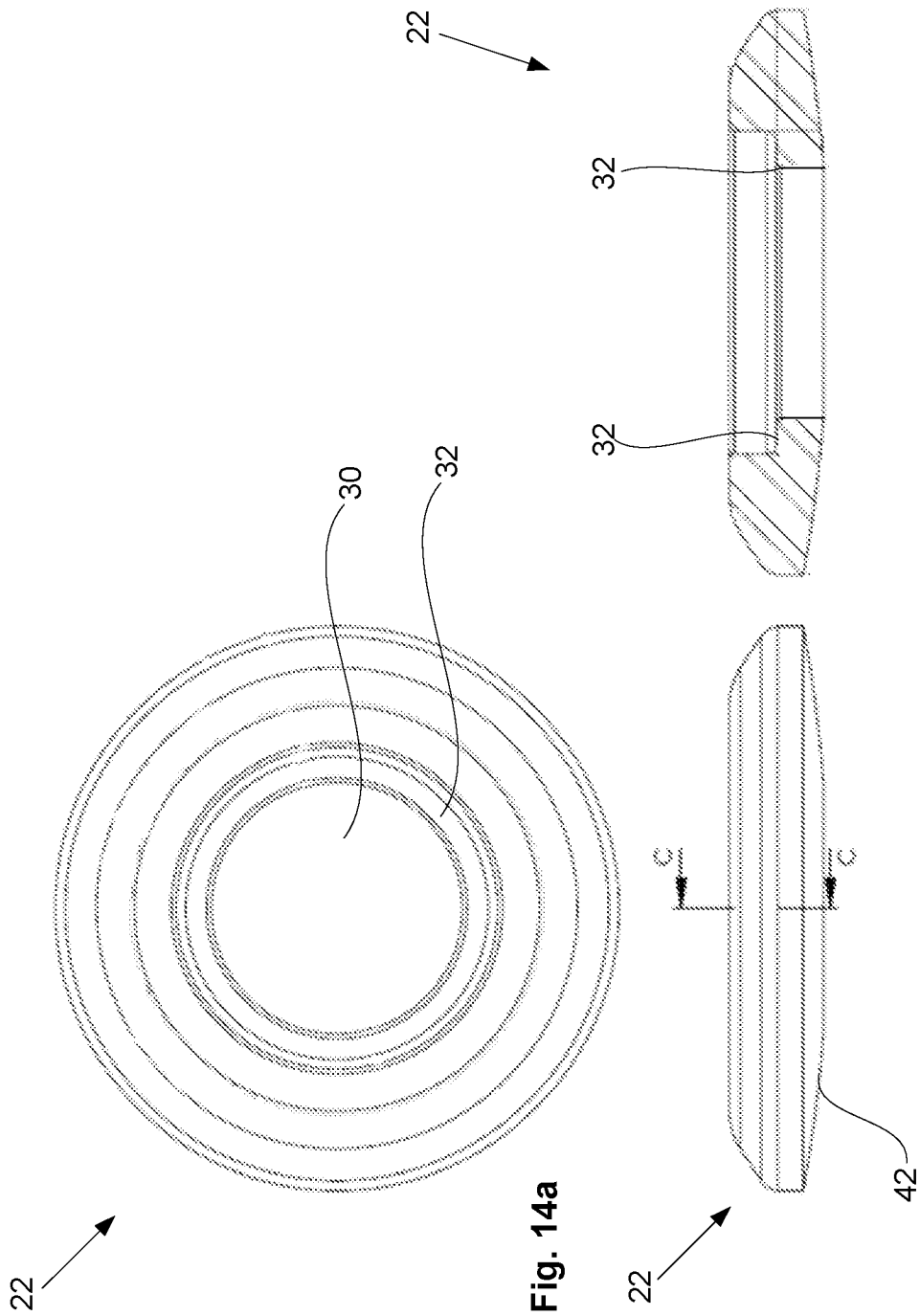

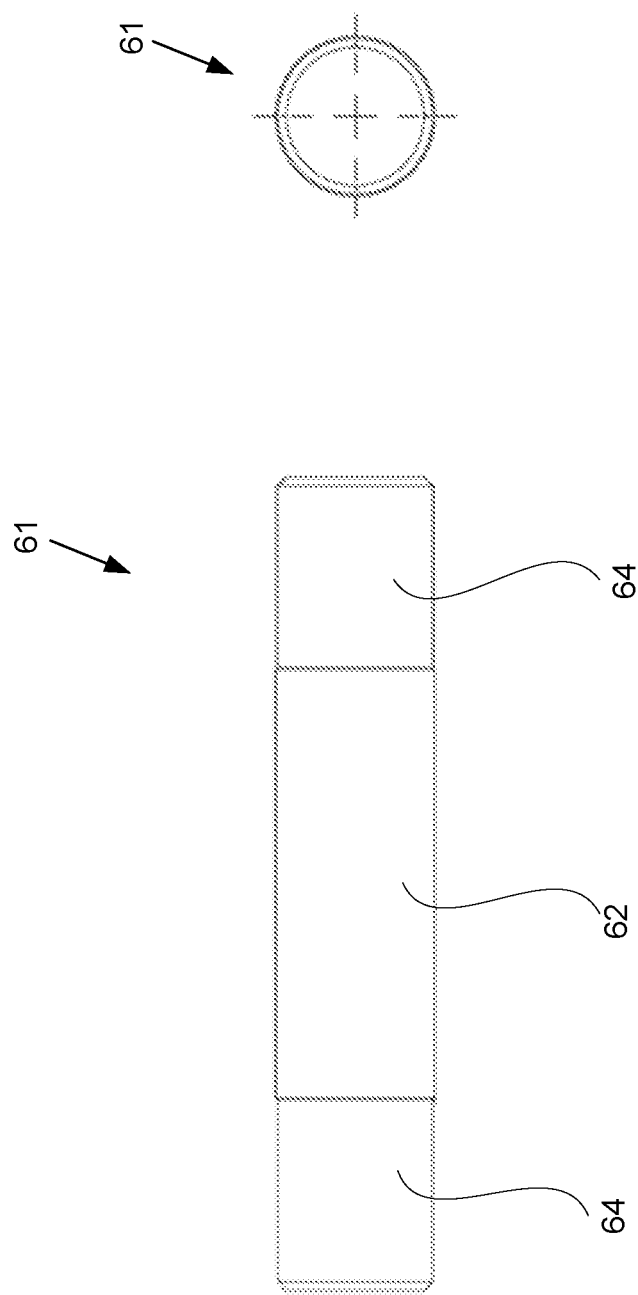

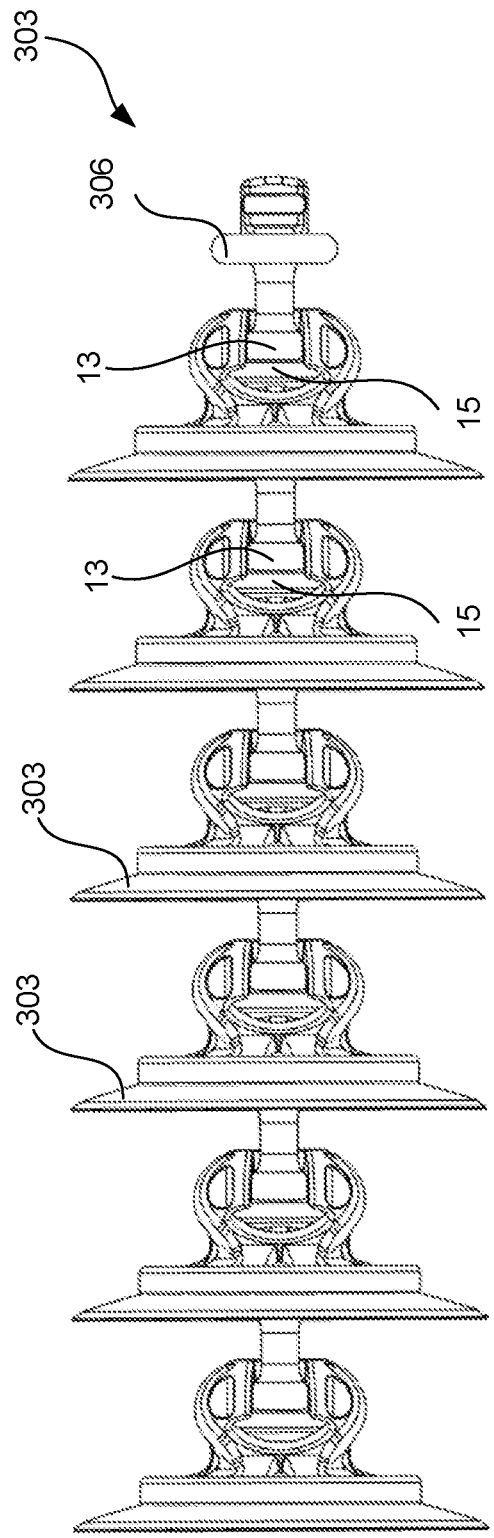
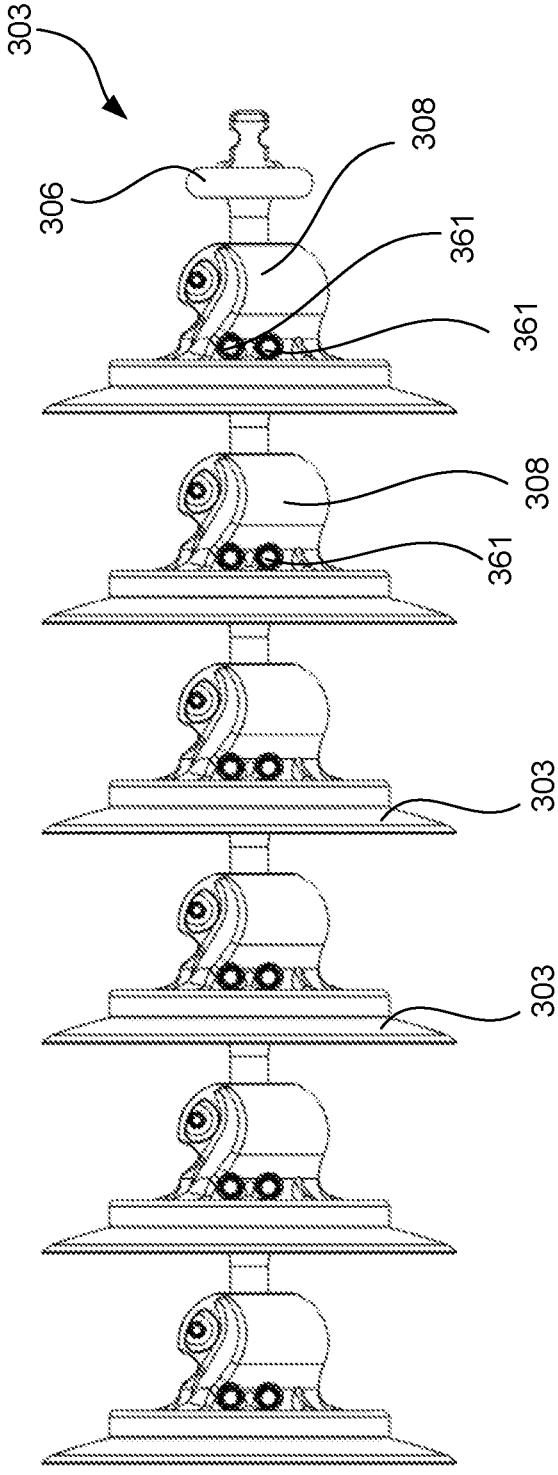
Fig. 21
Fig. 22

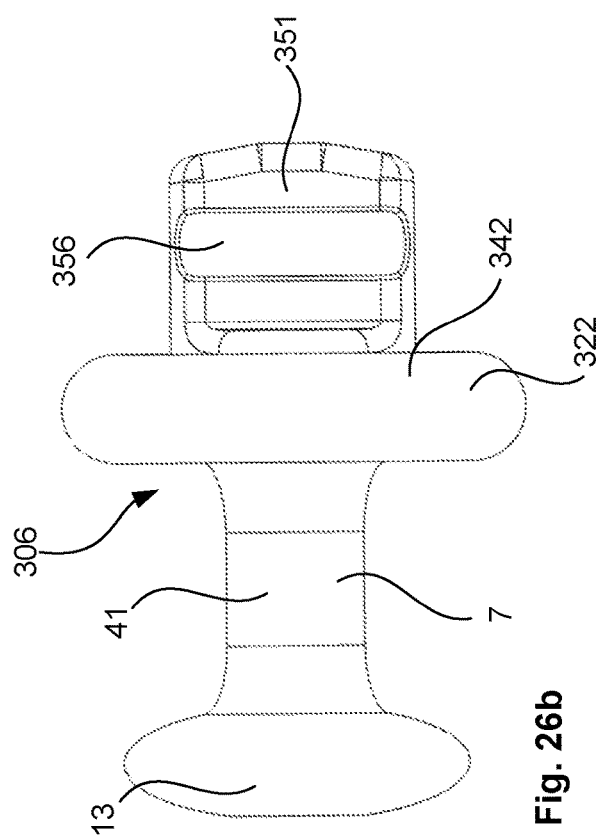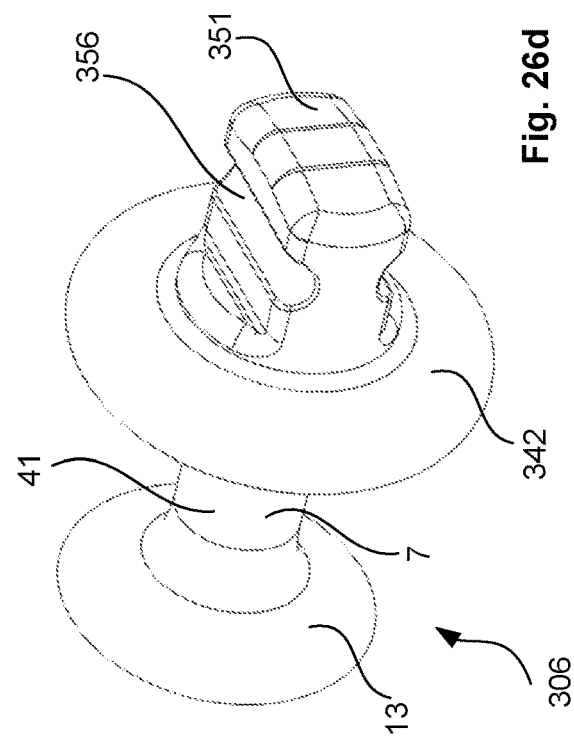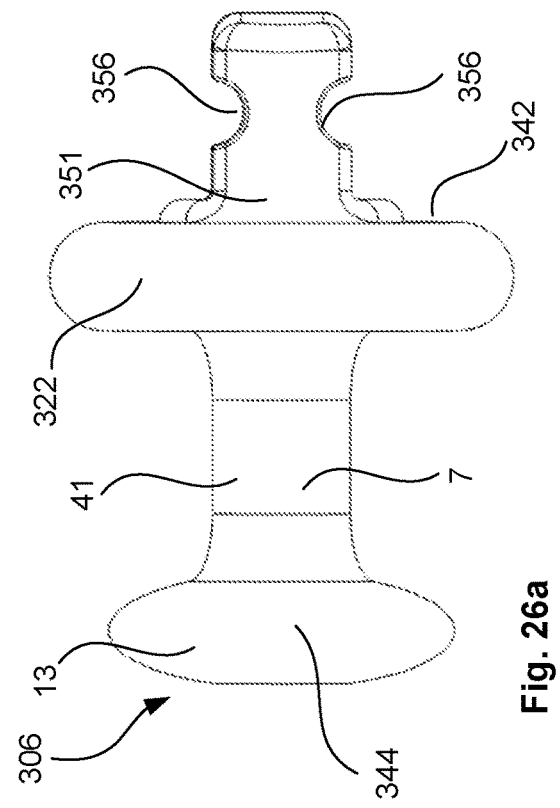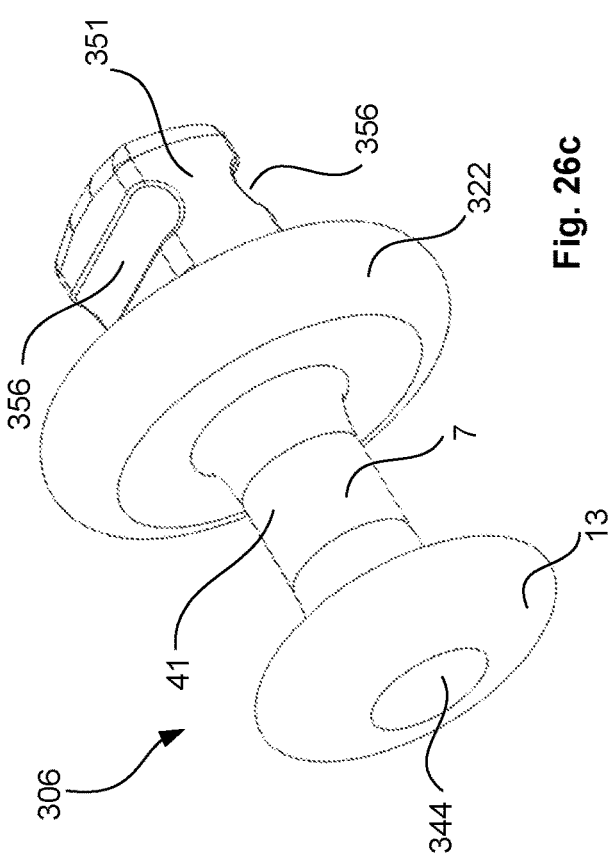

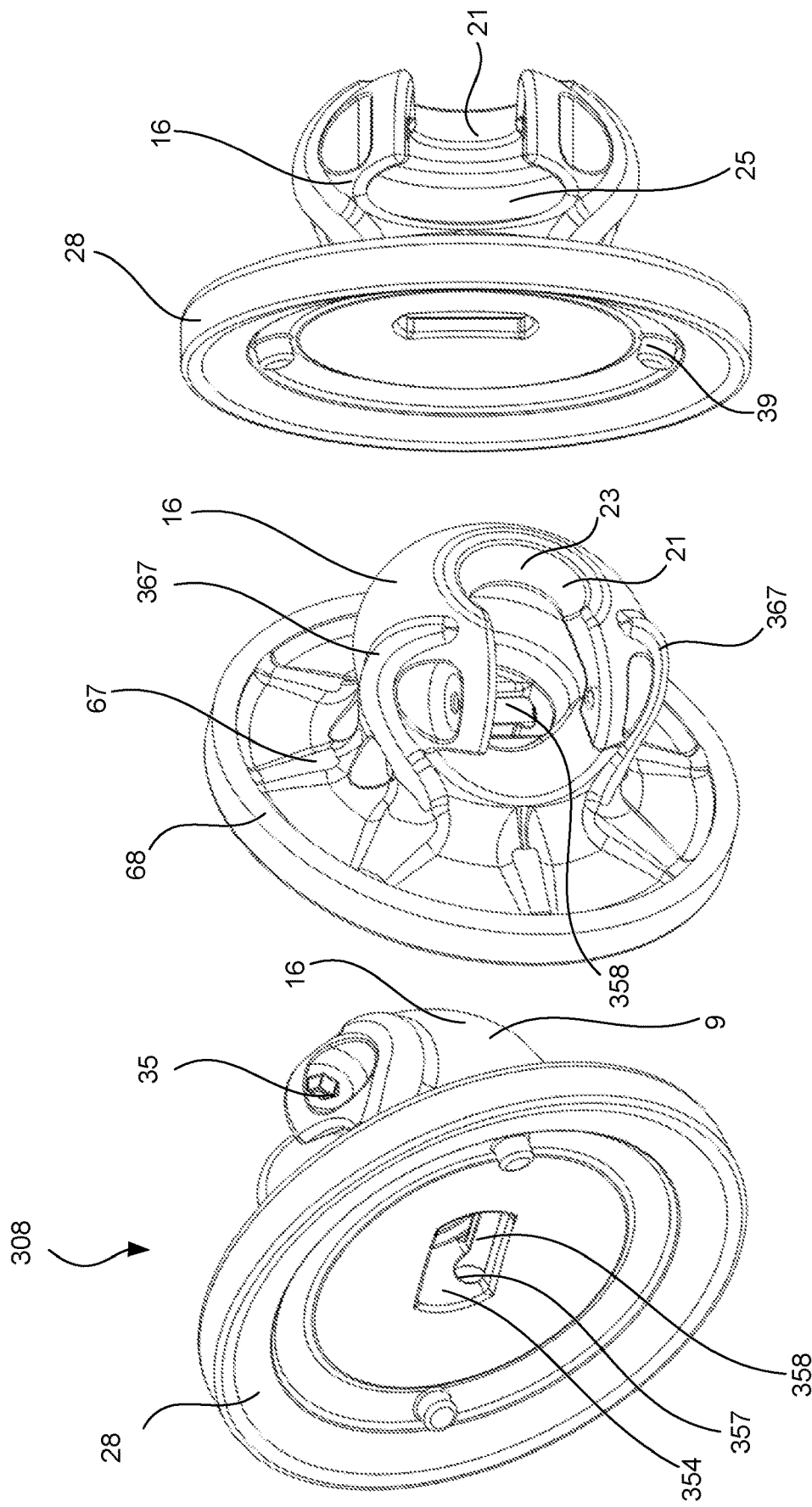

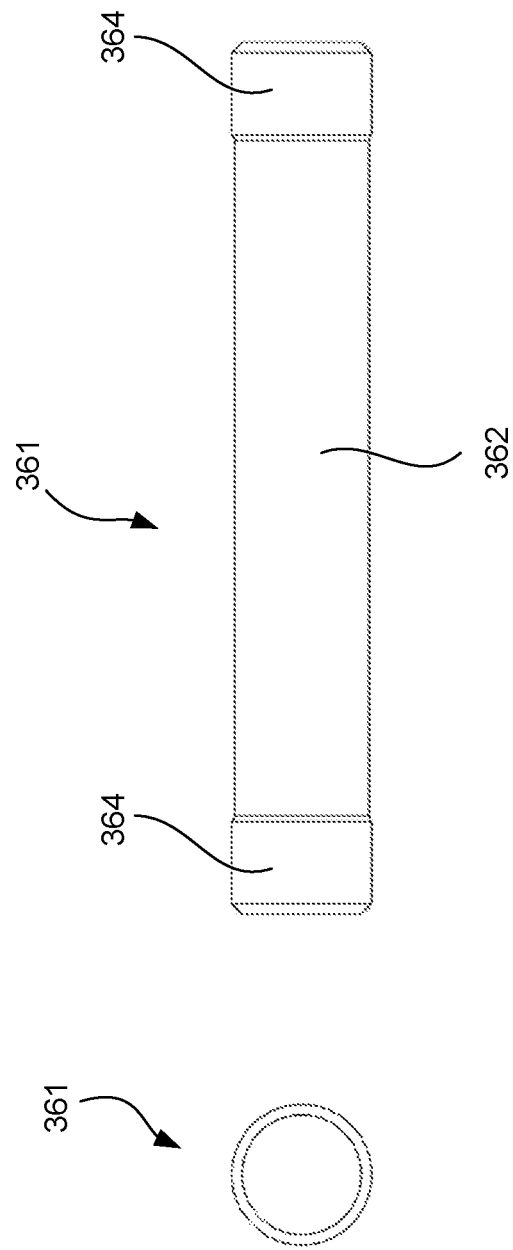

AGRICULTURAL GROUND ENGAGING CHAIN AND LINK SYSTEM

TECHNICAL FIELD

The present disclosure relates to agricultural equipment, in particular a harrow for preparing soil for agriculture. The present disclosure has particular relevance to agricultural equipment of the type including a chain of linked harrow members.

The present disclosure also relates to a link system for linking a first element to a second element.

BACKGROUND

Harrows have been used by farmers to assist in preparation of soil for farming. This can include breaking up the soil, furrowing it, and depositing the broken up material into the ground. It may also include uprooting and breaking stubble from the previous harvest or other plant material, such as weeds.

It is known to provide harrows that include a plurality of discs (harrow members) linked together to form a chain. The chain is pulled along the ground surface whereby the discs roll and engage the ground to break the soil and other material therein. Typically, the surfaces of the discs are at an angle to the direction of travel to provide an angle of attack between the discs and the soil.

Such harrows can be mechanised, with the chain of discs extending between two sides of a frame, with the frame towed by a tractor or other farm equipment. Such a known type of harrow is described in Australian patent no. 2007216912. In this prior art, each link in the chain includes a harrow disc, and a pair of link portions, such as a hook portion and a loop portion, disposed on either side of the harrow disc. To form the chain, the hook is hooked into the loop of an adjacent link, and the chain is tensioned to prevent the links from unhooking and separating. To separate the links, tension is relaxed so the links can be unhooked.

Known systems, such as that described in AU 2007216912 have a chain formed of links where the hook, loop and disc are all integrally formed. For example having the disc, hook portions, and loop portions welded together. In another form, the hook, loop, and disc of a link may be formed by a single casting, forging or other integrally forming technique. This is provided to assist assembly and disassembly for the user, as one needs only to hook and unhook the links.

However where the links are integral, it may be impractical to maintain or repair individual links that are worn or damaged. For example, if a hook portion is broken or damaged, the whole link may need to be discarded even if the loop portion and the harrow disc are still serviceable. Similarly, if the harrow disc is worn or damaged during use, the link may need to be discarded even if the loop portion and hook portion are serviceable.

Furthermore, integral links may result in limitations on methods of manufacture and material properties of the link. It may also lead to a compromise of the required properties of the disc and the materials. For example, the loop and hook portion has a primary function of joining the link together, whereas the harrow disc has the function of impacting with and engaging earth. Thus the harrow disc may wear at a rate much higher than the hook loop and require higher wear resistance and toughness/hardness than the other portions. Thus an integral link or integrally formed link may include a compromise in material properties. There may also be financial costs, as portions of the link may consequently be made of materials or formed by a process that is beyond the practical requirements.

As an example, it is known to manufacture a link with the harrow disc, loop portion, and hook portion in a single casting. Casting a component can produce a weaker component compared to other (and usually more expensive) techniques. As a result, to obtain an acceptable strength for the harrow disc, an integrally formed link made from casting may require the harrow disc to be thicker and heavier compared to, for example only, a forged harrow disc. However, for technical and financial reasons, it may be acceptable for the loop and hook portions to be formed of casting.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY

A link assembly of an agricultural ground engaging chain including a plurality of link assemblies, the link assembly including: a harrow member portion, a first link portion and a second link portion. The first link portion has opposite first and second sides. The first link portion is provided at the first side of the harrow member portion, wherein the first link portion includes a bulbous end. The second link portion is provided at the second side of the harrow member portion, wherein the second link portion includes a socket. To link with adjacent link assemblies, the bulbous end is received in a respective socket of an adjacent link assembly and the socket receives a respective bulbous end of another adjacent link assembly. The arrangement of a bulbous end of one link assembly received in the socket of the adjacent link assembly (and the same for subsequent link assemblies) resists the tension force along the agricultural ground engaging chain.

In some examples, the second link portion includes at a first bearing surface to define, at least in part, the socket and wherein at least a portion of the first bearing surface faces towards the second side of the harrow member portion. When the respective bulbous end is received in the socket, the first bearing surface engages the respective bulbous end to resist movement of the respective bulbous end in a direction away from the second side.

In some examples of the link assembly, the first bearing surface is formed from an inwardly extending flange around a socket aperture of the socket.

In some examples, the second link portion further comprises a track to allow insertion of the respective bulbous end into the socket. The track may include a substantially T-shaped slot.

In some examples, the track has an entry path to the socket that is between 20 to 40 degrees relative to the first bearing surface. In alterative examples, the entry path to the socket is between 0 to 20 degrees. In yet other examples, the entry path to the socket is between 40 to 60 degrees. In yet other examples the entry path may be from 60 degrees up to around 90 degrees.

In some examples, the entry path to the socket has a direction towards the first bearing surface. In some alternatives, the entry path may have a direction that is substantially parallel to the first bearing surface, or even away from the first bearing surface. In some examples, the socket may include a pocket to assist retention of the bulbous end, whereby tension in the chain retains the bulbous end in the pocket. The pocket may be useful in variations where the entry path into the socket is in a direction substantially away from the first bearing surface.

In some examples the link assembly further comprises a lock, wherein the lock selectively interferes with the track to retain the respective bulbous end in the socket.

The lock may comprise at least one lock pin and wherein the second link portion comprises at least one lock pin aperture. The lock pin is inserted through the lock pin aperture to block passage of the first link portion through the track.

In the link assembly, the socket may comprise an arcuate second bearing surface, wherein the second bearing surface faces a main axis of the link assembly to resist movement of the respective bulbous end in directions perpendicular to the main axis.

In the link assembly, the first link portion may comprise a shank portion extending from the first side to the bulbous end. In some examples, the shank portion extends along a shank portion axis and the bulbous end is substantially symmetrical around the shank portion axis. The substantially symmetrical bulbous end is rotatable around the shank portion axis inside the respective socket of an adjacent link assembly. The shank length may vary to control spacing in the assembly.

In one alternative of the link assembly, the shank portion extends along a shank portion axis and the bulbous end includes a first profile to engage with a corresponding second profile of the respective socket of an adjacent link assembly. The engagement prevents or reduces relative rotation of the link assembly and the adjacent link assembly around the link portion axis.

In the link assembly, the harrow member portion may include at least anti-rotation aperture, wherein the anti-rotation aperture engages with at least one other component of the link assembly to prevent relative rotation of the harrow member portion and the at least one other component. The second link portion may include at least one protrusion to engage with the at least one anti-rotation aperture.

In the link assembly, the harrow member portion may be substantially dish-shaped with the first side having a concave surface and the second side having a convex surface. The harrow member portion may include a central aperture, wherein the first link portion and the second link portion are interconnected through the central aperture. The harrow member portion may be locked by a feature on the first link portion and/or the second link portion. This may include protrusions or other features to engage with the convex surface or concave surface of the harrow member portion.

In one example, the link assembly includes a first component and a second component. The first component includes the first link portion and a projecting portion opposite the first link portion. The second component includes the second link portion and a receptacle. In some examples, the second component is the largest component, by mass, in the link assembly. When assembled, the first component passes through the central aperture of the harrow member to be received in the receptacle of the second component.

The projecting portion may have at least one first fastener receiving passage and the second component may have at least one second fastener receiving passage. When assembled, a fastener may be passed through the first and second fastener receiving passages. The fastener may include a stepped profile to assist retention in the first and second fastener receiving passages.

In some examples of the link assembly, the harrow member portion is a resilient member. When assembled, the harrow member portion is elastically deformed between the first component and the second component such that the resultant elastic stress in the harrow member portion causes wall portions of the first and second receiving passages to urge against the fastener to increase friction between the wall portions of the first and second receiving passages and fastener.

In some examples, of the link assembly, the second link portion further comprises a plurality of radially extending support ribs.

In some examples, the link assembly further comprises a ribbon extending around an outer perimeter of the second link portion. This may include a ribbon that connects the outer portions of the support ribs. The ribbons may increase the rigidity, strength and durability of the second link portion.

There is also disclosed an agricultural ground engaging chain including a plurality of link assemblies described above.

There is also disclosed a link system to link a first element to a second element. The link system comprising: a first link portion fixed to the first element; and a second link portion fixed to the second element. The first link portion includes a bulbous end. The second link portion comprises: a socket having a first bearing surface formed by inwardly extending flanges around a socket aperture, and a track to allow insertion of the bulbous end into the socket. After insertion, the bulbous end of the first link portion may level inside the socket to increase contact with the first bearing surface and whereby the socket substantially surrounds the circumference of the bulbous end. The bulbous end is received in the socket and the first bearing surface engages the bulbous end to resist movement in opposite directions along a main axis between the first link portion and second link portion.

In the link system, the track has an entry path to the socket that is between 20 to 40 degrees relative to the first bearing surface.

BRIEF DESCRIPTION OF DRAWINGS

The invention will now be described, by way of reference only, with respect to the accompanying drawings.

FIG. 2 is a top view of the agricultural ground engaging chain in FIG. 1;

FIG. 3 is a side view of the agricultural ground engaging chain in FIG. 1;

FIGS. 4a to 4c illustrates a sequence of assembling a link assembly to another link assembly;

FIGS. 6a and 6b are front and rear perspective views of a link assembly;

FIGS. 8a to 8h illustrate various sectioned views of the link assembly of FIGS. 6a and 6b;

FIGS. 9a to 9d are views of a first component of the link assembly of FIGS. 6a and 6b;

FIGS. 10a to 10c illustrate various perspective views of a second component of the link assembly of FIGS. 6a and 6b;

FIGS. 12a to 12g illustrate various sectioned views of the second component in FIGS. 10a to 10c;

FIGS. 14a to 14c illustrate top, side and sectioned side views of a clamping subcomponent of the link assembly of FIGS. 6a and 6b;

FIGS. 15a and 15b illustrate side and end views of a fastener of the link assembly of FIGS. 6a and 6b;

FIG. 21 is a top view of the agricultural ground engaging chain in FIG. 20;

FIG. 22 is a side view of the agricultural ground engaging chain in FIG. 20;

FIGS. 26a to 26d illustrate side, top, front perspective and rear perspective views of a first component of the link assembly in FIG. 23;

FIGS. 27a to 27c illustrate front perspective, rear perspective and another front perspective view of a second component of the link assembly in FIG. 23;

FIGS. 29a and 29b illustrate an end view and side view of a fastener of the link assembly in FIG. 23;

DESCRIPTION OF EMBODIMENTS

Overview

Figure 1:
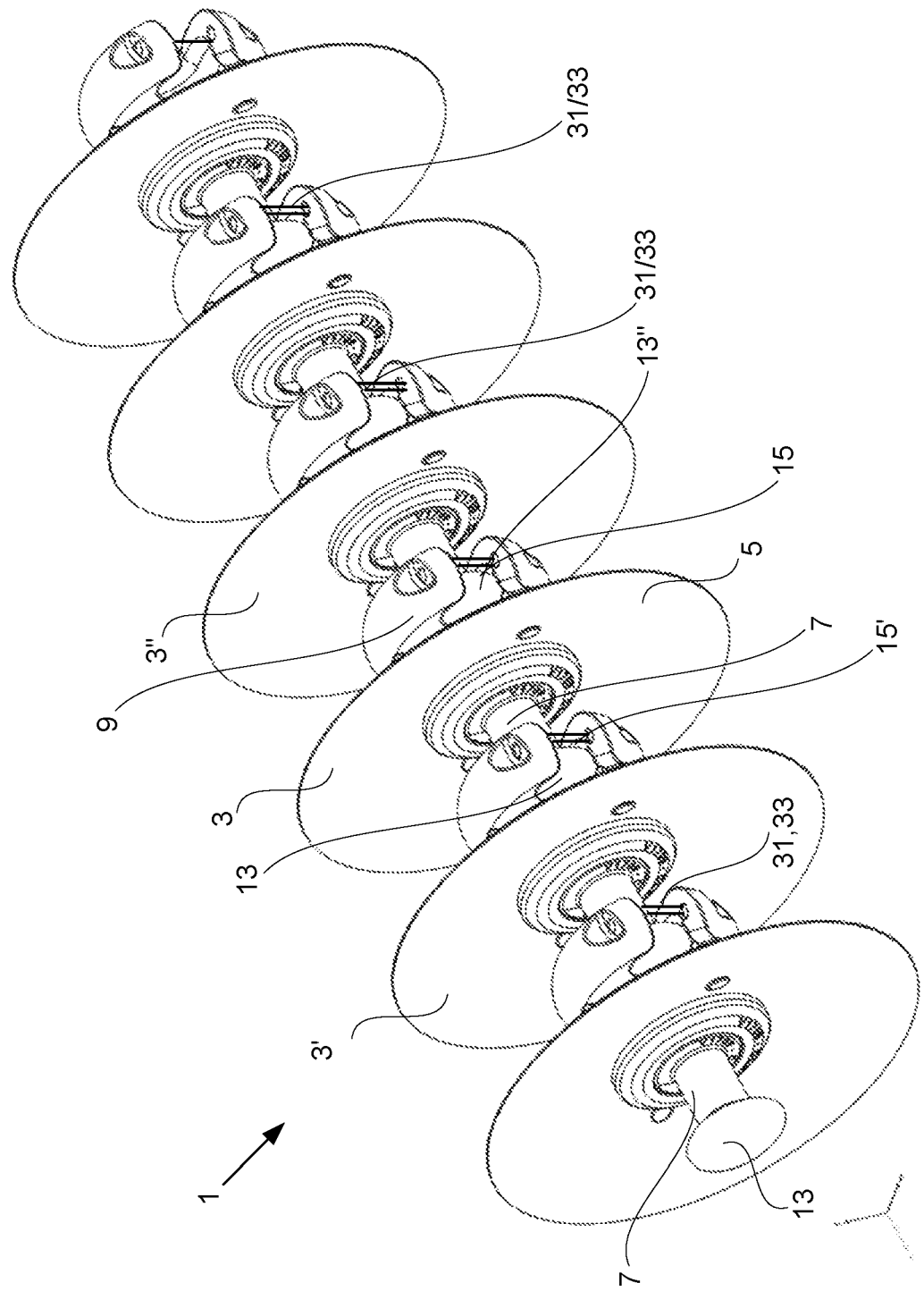
FIG. 1 illustrates a perspective view of an agricultural ground engaging chain comprising multiple link assemblies.

FIGS. 1, 2, and 3 illustrate an agricultural ground engaging chain 1 according to one embodiment of the present disclosure. The chain 1 includes a plurality of link assemblies 3, each having a harrow member portion 5, a first link portion 7, and a second link portion 9. The harrow member portion 5 has opposite first 17 and second 19 sides. The first link portion 7 is provided at the first side 17 of the harrow member portion 5, wherein the first link portion 7 includes a bulbous end 13. The second link portion 9 is provided at the second side 19 of the harrow member and includes a socket 15. To link the adjacent link assemblies 3, 3', 3", the bulbous end 13 is received in a respective socket 15' of an adjacent link assembly 3'. The socket 15 receives a bulbous end 13" of another adjacent link assembly 3". Additional link assemblies 3 can be added to form the chain 1 until the desired length is achieved.

Figure 18:
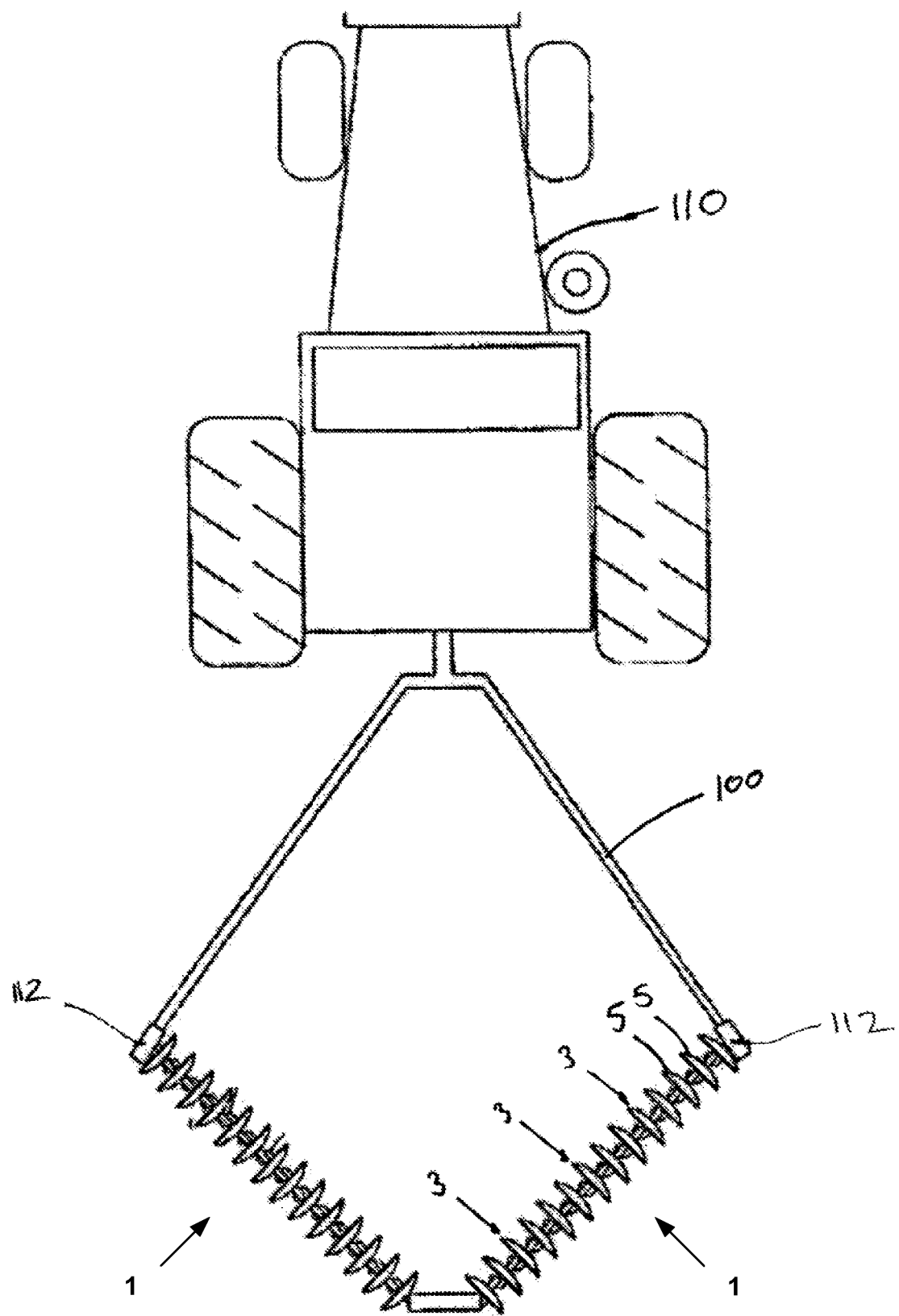
FIG. 18 is a top view of an agricultural ground engaging chain towed behind a tractor.

Referring to FIG. 18, the agricultural ground engaging chain 1 is attached to a frame 100, which in turn is pulled by a tractor 110. The ends of the ground engaging chain 1 are attached to free spinning spindles 112, thereby allowing the chain 1 to freely rotate as the harrow members 5 move across the ground. In some variations where relative rotation is not desired, the geometries and profiles of the bulbous end and socket can be configured to prevent relative rotation.

Figure 16A:
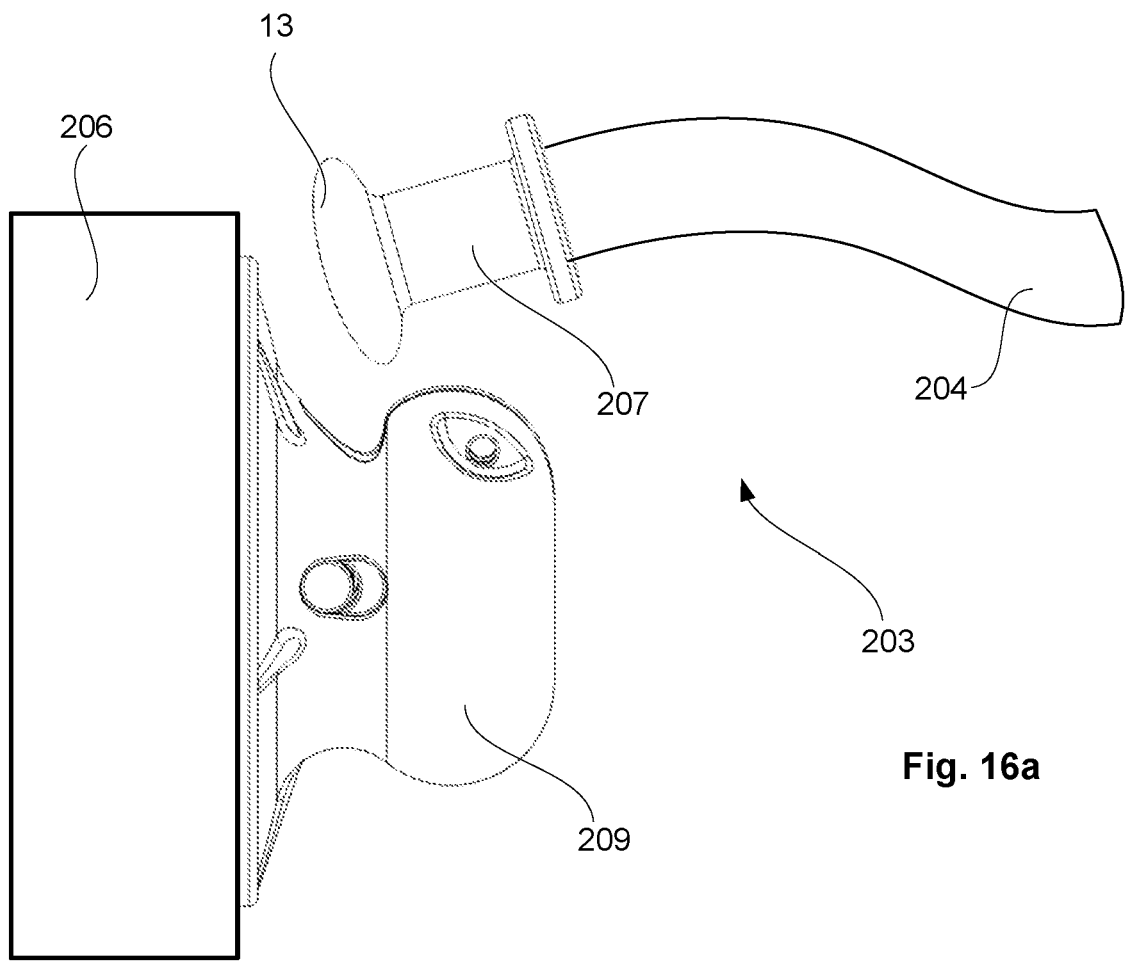
FIGS. 16a and 16b illustrate a sequence of linking a first link portion to a second link portion in a link system.
Figure 16B:
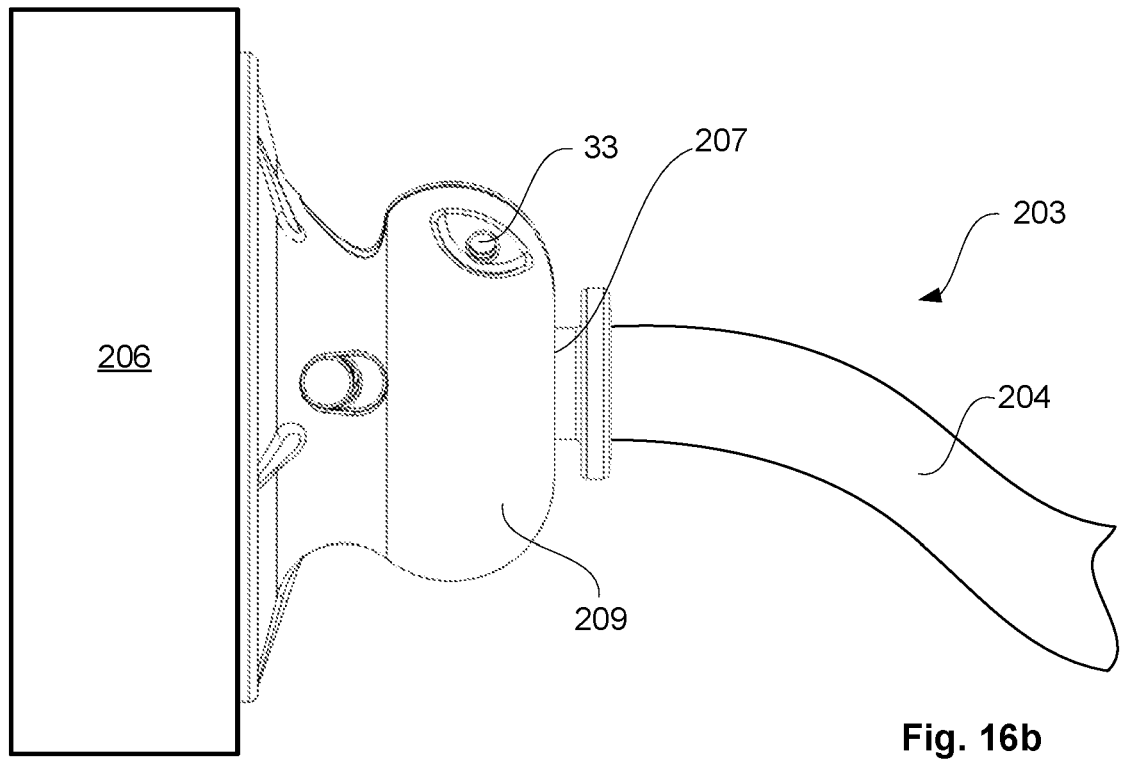
Figure 17:
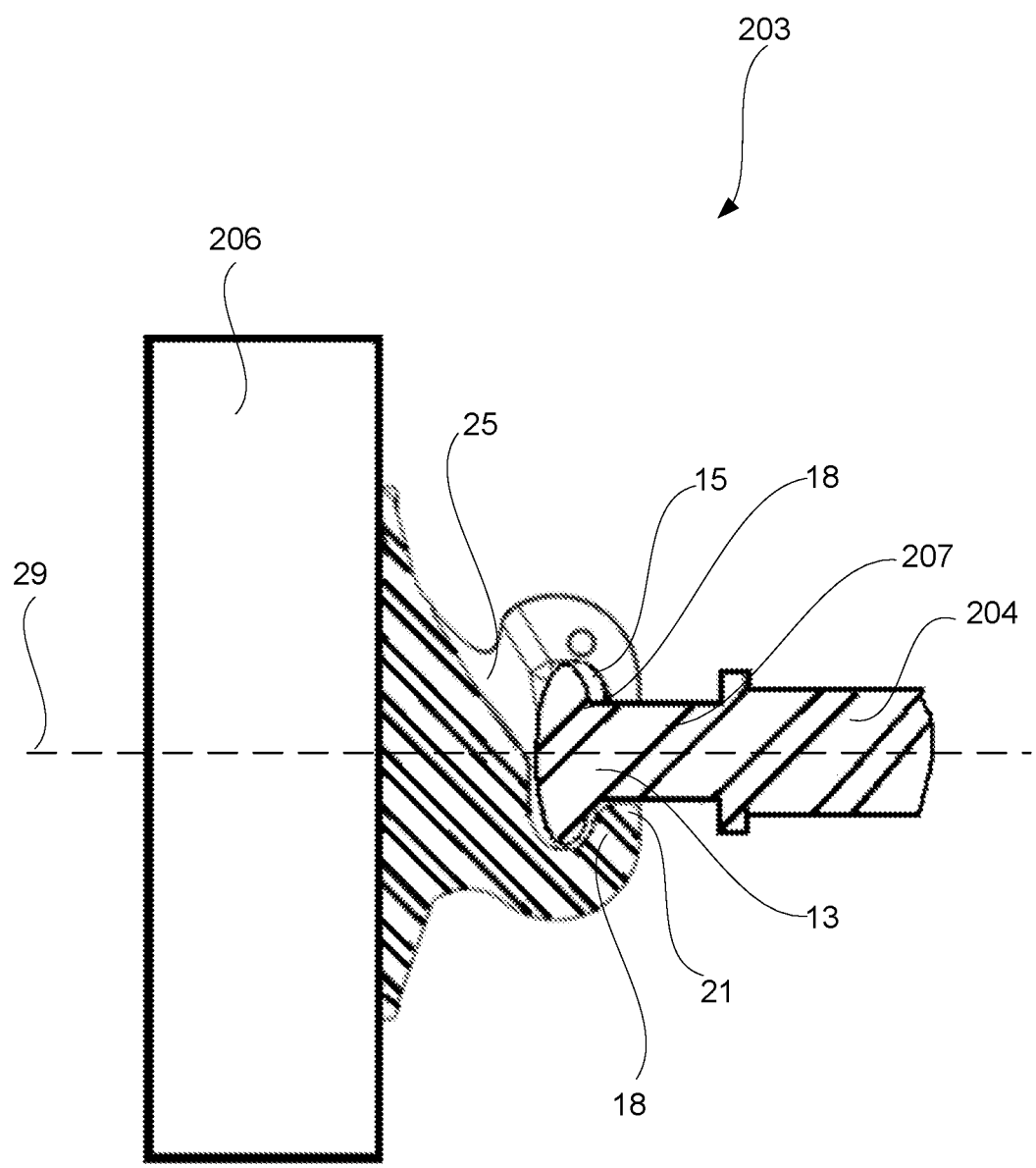
FIG. 17 illustrates a sectioned side view of the link system in FIG. 16b.

FIGS. 16a to 17 illustrate a link system 203 to link a first element 204 to a second element 206. In some examples either or both of the first element 204 or the second element 206 is part of a chain, cable, or rope. The system 203 includes a first link portion 207 fixed to the first element 204 and a second link portion 209 fixed to the second element 206. The first link portion 207 includes a bulbous end 13. The second link portion 209 includes a socket 15 having a first bearing surface 18 formed of inwardly extending flanges 21 around a socket aperture 23. When the system 203 is assembled, the bulbous end 13 is received in the socket 15 so that the first bearing surface 18 engages the bulbous end 13 to resist movement in opposite directions along a main axis 29 between the first link portion 207 and second link portion 209. In addition, the configuration may resist movement in other directions, particularly resisting against perpendicular reaction forces to the axis 29. Reaction forces against bearing surface 18 can be controlled by spacing between the top of bulbous end 13 and the length of shank portion 41. A track 25 is provided to allow insertion of the bulbous end 13 into the socket 15 during assembly.

The link system 203 may be used as a shackle to connect elements to each other. In some examples, this may include use as part of a tow rope system, hoist system or a mooring system.

The link assembly 3 and link system 203 described herein may allow easy assembly and disassembly. In particular, the features of a bulbous end 13 and socket 15 may allow easy insertion and linking of constituent parts. In some examples, the bulbous end 13 may rotate freely in the socket 15, such that adjacent link assemblies can rotate freely relative to each other around the main axis 29. This is in contrast to hook and loop systems where a hook has restricted degree of rotation between the hook and the loop. This may reduce torsional forces and stress on components of the chain 1 and link system 203. It is to be appreciated that some alternative variations of the link assembly 3 may include features to prevent relative rotation between adjacent link assemblies. For example, this may include providing grooves, slots, indentation and corresponding protrusions at the bulbous end 13 and at the first bearing surface 18 or second bearing surface 27. These features may engage each other the prevent or reduce relative rotation.

Assembling the Link Assembly 3

Assembling a plurality of link assemblies 3, 3' together will now be discussed with reference to the sequence in FIGS. 4a to 4c that shows an external view and FIGS. 5a to 5c that shows a cross-sectional view.

Figure 5A:
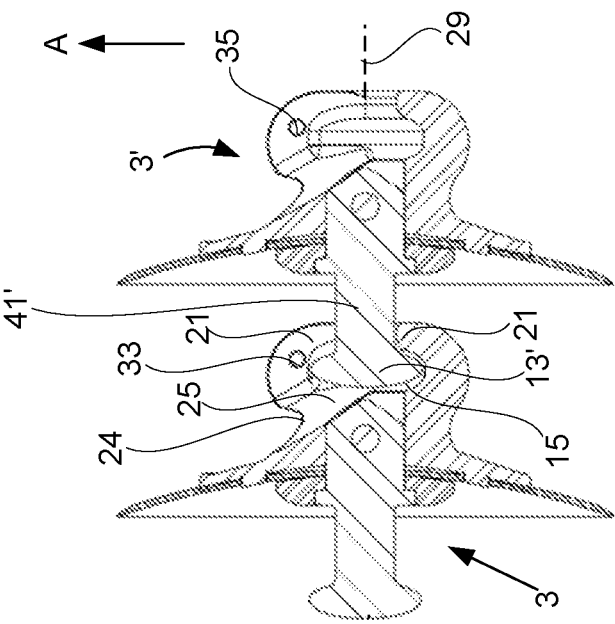
FIGS. 5a to 5c illustrates the sequence of FIGS. 4a to 4c in a sectioned view.

In FIGS. 4a and 5a, a link assembly 3' is positioned so that the bulbous end 13' is located near an opening 24 of a track 25 that leads to a socket 15 of an adjacent link assembly 3. In this example, the track 25 has an entry path to the socket 15 that is at an angle relative to a first bearing surface 18 of the socket 15. To facilitate insertion, the link assembly 3' may also be orientated to a corresponding angle. This may be particularly important if the track and bulbous end 13 have a close profile fit.

Figure 5B:
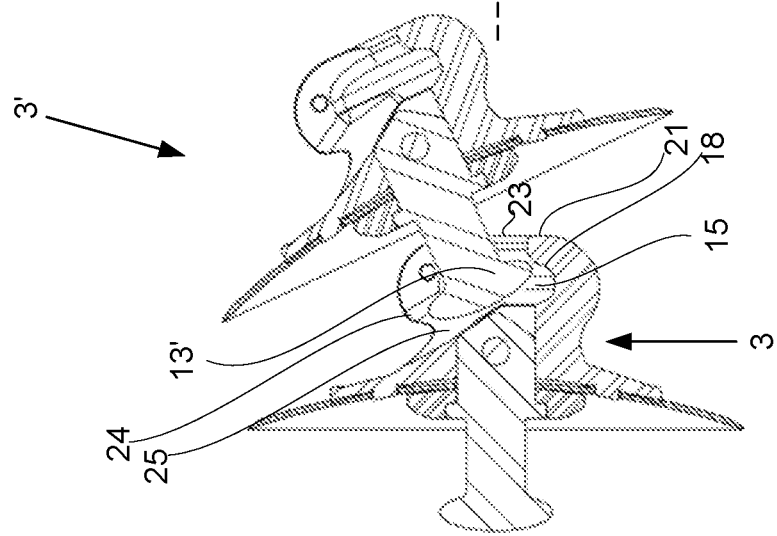

In FIGS. 4b and 5b, the bulbous end 13' of the link assembly 3' is slid through the track 25 towards the socket 15. Once the bulbous end 13' reaches the socket 15, the link assembly 3' may be orientated to be aligned, along a main axis 29, with the other link assembly 3 (as show in FIG. 5c). The socket 15 has inwardly extending flange(s) 21 that provide, at least in part, a first bearing surface 18 of the socket 15. The two adjacent link assemblies 3, 3' may then be pulled taught so that the bulbous end 13' in the socket 15 moves towards the first bearing surface 18. This first bearing surface 18 resists separation of the link assemblies 3, 3' from one another in opposite directions to the main axis 29. When at the bulbous ends are proximal to the first bearing surface 18, relative movement of the link assemblies 3, 3' off the main axis 29 may be restricted by the first bearing surface 18.

To prevent the link assembly 3, 3' from separating during use, a lock 31 may be used to retain the bulbous end 13' in the socket 15. In one example, this is achieved by inserting a lock pin 33 into the lock pin aperture 35 so that the lock pin 33 interferes and blocks the track 25. This prevents the first link portion 7 from sliding out of the socket 15 and/or track 25.

The above steps may be repeated until the desired length of the chain 1 is achieved.

To disassemble one or link assemblies 3 from the chain 1, the above steps may be done in reverse order. Advantageously, one or more specific link assemblies 3 may be removed and serviced or replaced without having to disassemble the entire chain 1.

Similar principles and steps from assembly and disassembly may also be used to link the first link portion and second link portion of the link system 203.

Description of Components of a First Example

A first example of a link assembly 3 is illustrated in FIGS. 6a to 8h. FIGS. 6a and 6b show perspective views of the link assembly, FIGS. 7a to 7e show orthogonal projections, and FIGS. 8a to 8e show side views and sectioned side views. In this example, the link assembly 3 includes:

a first component 6 that includes the first link portion 7 with the bulbous end 13;
a second component 8 that includes the second link portion 9 and the socket 15;
a harrow member portion 5 having opposite first 17 and second 19 sides;
a clamping subcomponent 22;
fastener 61 to fasten the components of the link assembly together; and
a lock pin 33.

These components may be constructed of metal and/or metal alloys such as iron, steel, carbon steel, etc. Each of these components will be described in detail below.

First Component 6

Referring to FIGS. 9a to 9d, the first component 6 includes the first link portion 7. The first link portion 7 includes a narrow shank portion 41 extending on a shank portion axis 43, wherein at one end is the bulbous end 13.

The bulbous end 13 may have a curved T-shape or mushroom shape. In some examples, the shape is symmetrical and rounded so that the bulbous end 13 may rotate inside the socket 15. Having a rounded shape may prevent particular points of high forces and/or stress. In some alternative examples, the bulbous head may have a substantially spherical shape (e.g. to provide a ball and socket connection). In some alternatives, the bulbous end may have an oval shape that is received in a correspondingly shaped socket that prevents relative rotation for applications where relative rotation is not desirable. It is to be appreciated that in other alternatives, the bulbous end may include asymmetrical shapes. Such a bulbous end may fit and engage with a correspondingly shaped socket to prevent or reduce relative rotation. This may include having a corresponding profile in a pocket of the socket, whereby when the chain is tensioned the bulbous end 13 is drawn into the pocket such that they are engaged with one another. In one example, the bulbous end may by T-shaped to engage with slots in the socket 15. In other examples, anti-rotation features may include indentations, slots, groove, protrusions, etc. on the surface of the bulbous end 13. The socket 15 (and surfaces therein) may have corresponding features.

At the opposite end to the bulbous end and shank portion is a projecting portion 51. When assembled, the projecting portion 51 is inserted through the harrow member portion 5 and into the second component 8. One or more first fastener receiving passages 55 are provided on the projecting portion 51 so that a fastener 61 can be received to fasten the first component to the second component 8.

At the end of the projecting portion 51 is at least one profiled surface 65. In this example, the profiled surface includes a facet to match the track 25 profile. That is, to provide clearance for the bulbous end 13 of an adjacent link assembly 3 to pass through to the socket 15.

A collar 126 is provided between the shank portion 41 and the projecting portion 51. When assembled, the first link portion 7 is at the first side 18 of the harrow member portion 5 and the collar 126 abuts with a bearing surface 32 on the clamping subcomponent 22. The clamping subcomponent 22, in turn, provides one half of the clamping force against the harrow member portion 5 to keep the harrow member portion between the first link portion 7 and second link portion 9.

Second Component 8

Referring to FIGS. 10a to 12g, the second component 8 has a second link portion 9 for locating on the second side 19 of the harrow member portion 5. The second link portion 9 includes a body 16 having a socket 15 to receive the bulbous end 13 from another link assembly 3'.

Figure 5C:
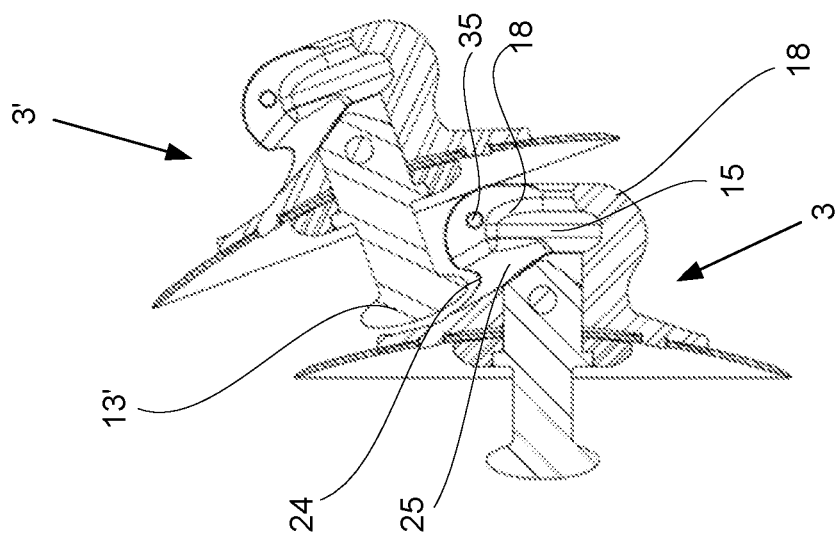
Figures 7A, 7B, 7C:
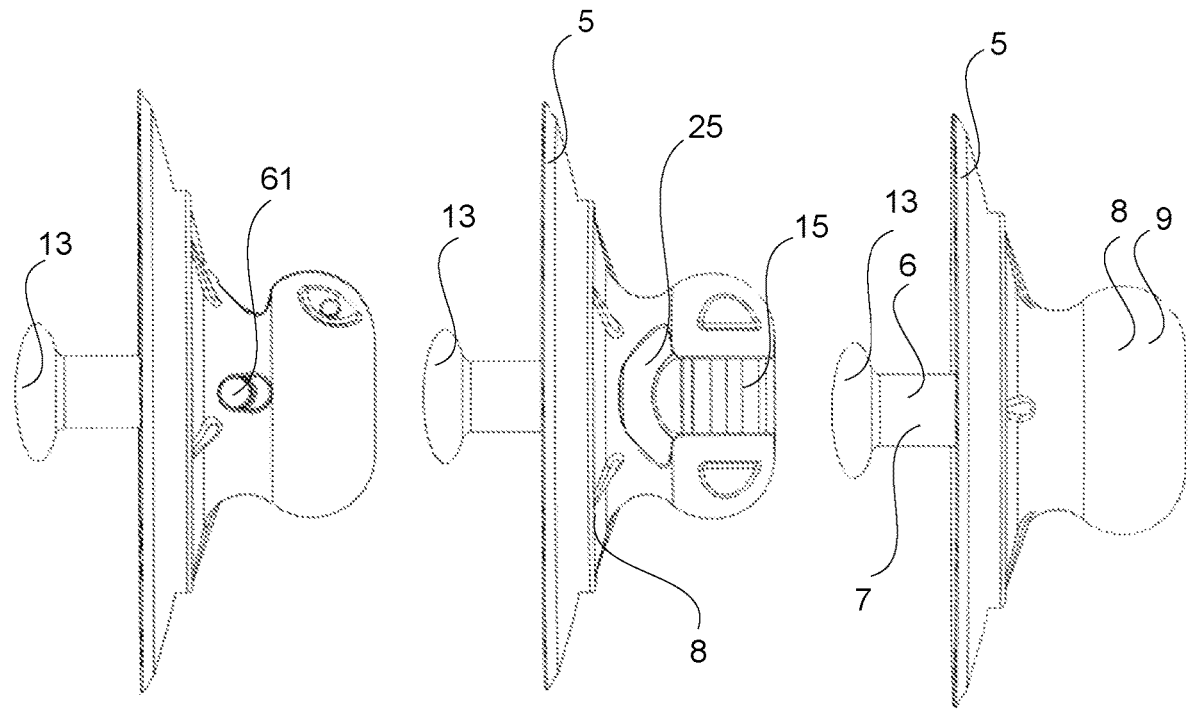
FIGS. 7a to 7e are orthogonal views of the link assembly of FIGS. 6a and 6b.
Figures 7D, 7E:
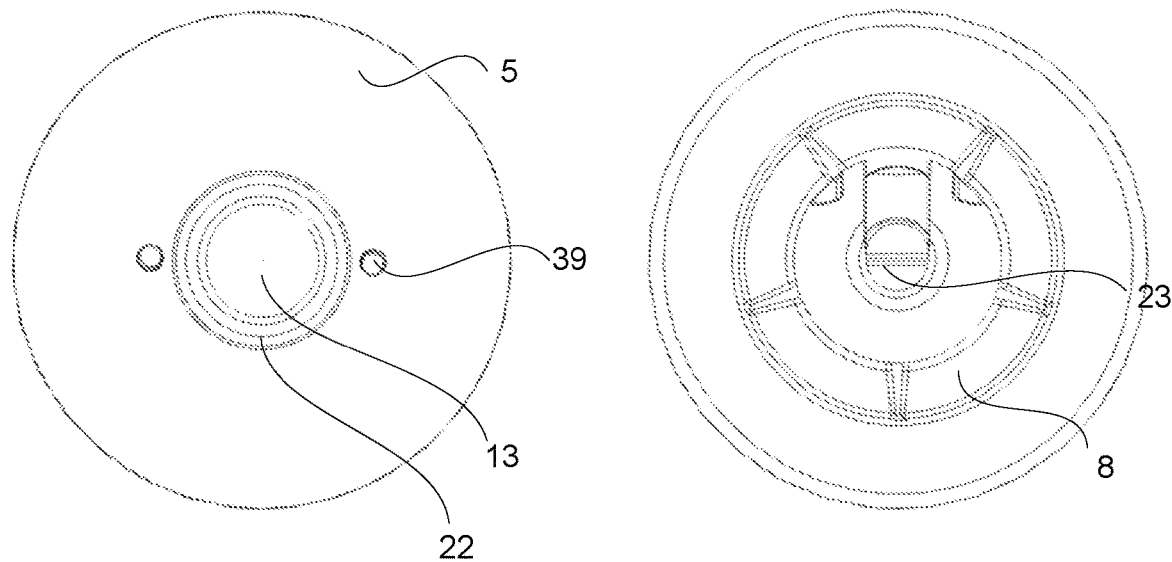
Figure 11B:
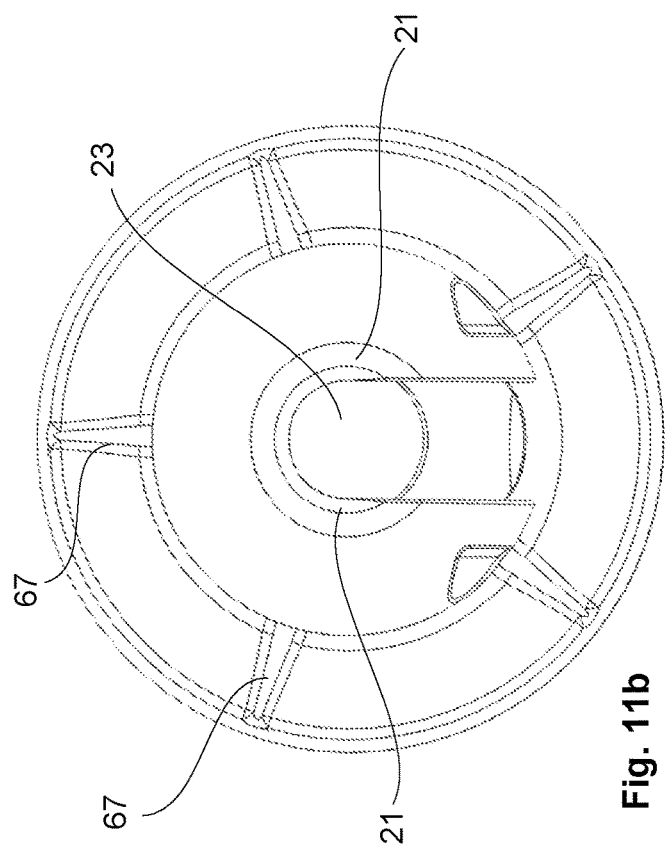
FIGS. 11a to 11d illustrate front, back, top and side views of the second component in FIGS. 10a to 10c.
Figure 11D:
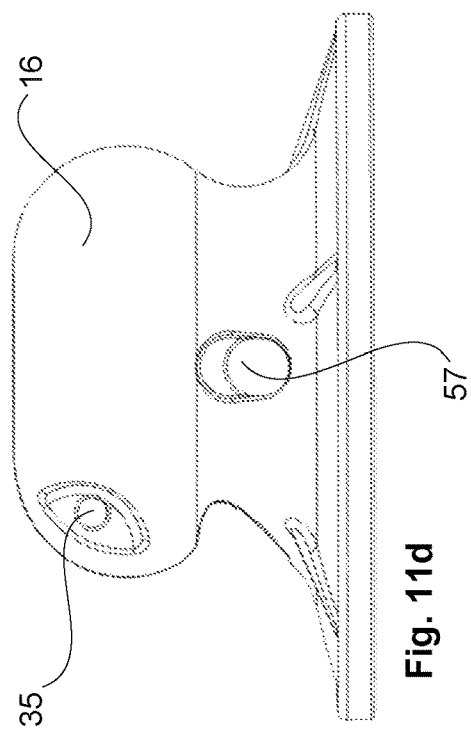
Figure 11A:
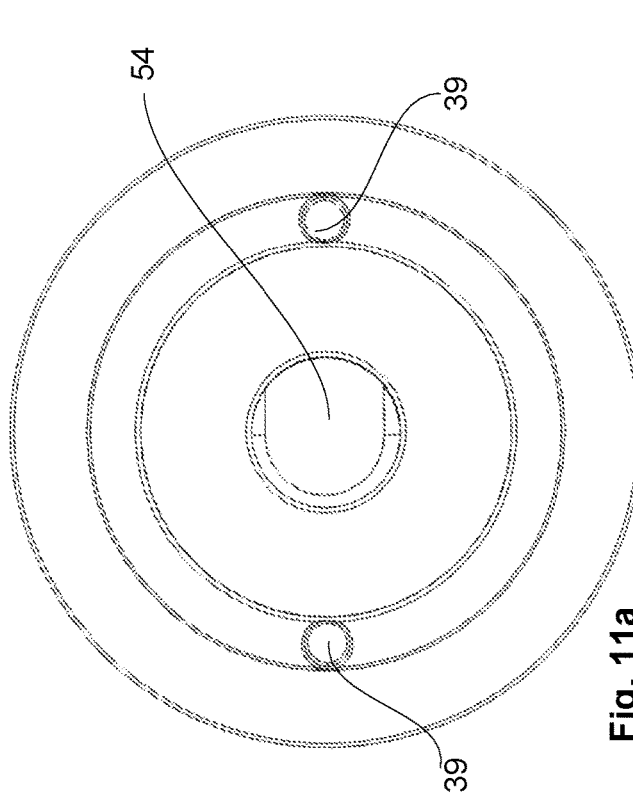
Figure 11C:
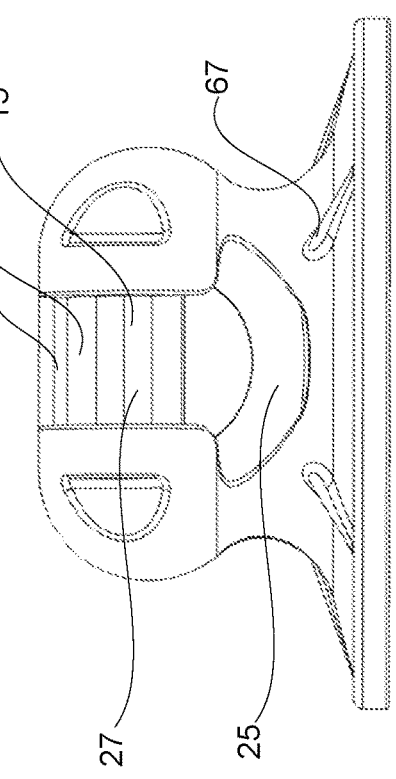
Figure 13A:
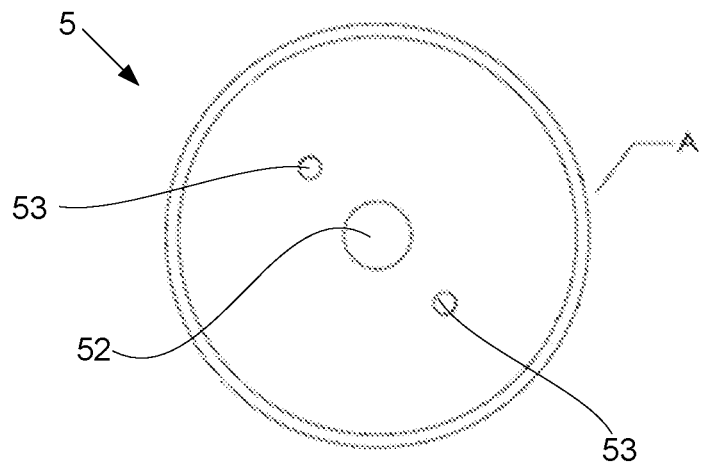
FIGS. 13a to 13d illustrate rear, side, front and sectioned side views of a harrow member portion of the link assembly of FIGS. 6a and 6b.
Figure 13B:
Figure 13C:
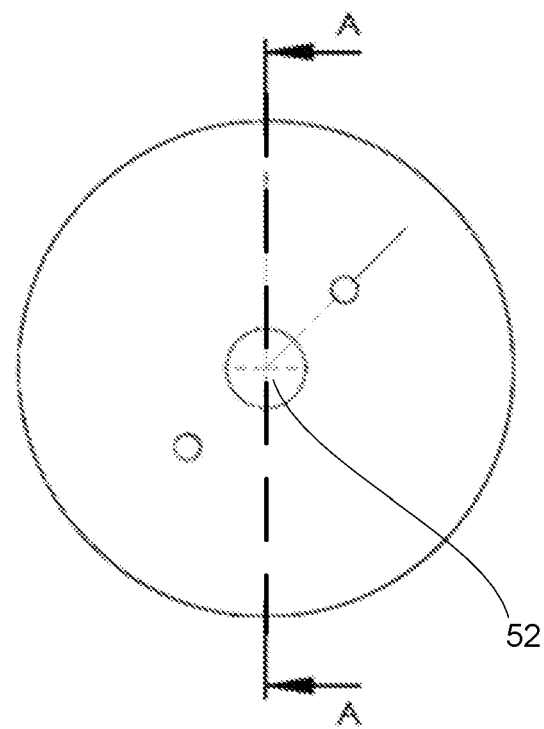
Figure 13D:
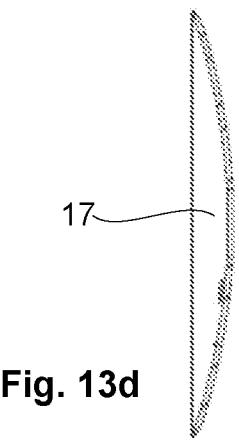

The body 16 includes a socket aperture 23 that leads to the socket 15 so that when a bulbous end 13' of another link assembly 3' is received in the socket, the shank portion 41' of other link assembly 3 passes through the socket aperture 23 as shown in FIG. 5c.

An inwardly extending flange 21, that extends towards the centre of the socket aperture 23, and defines at least part of a first bearing surface 18 of the socket 15 as best shown in FIGS. 12d and 12f. This first bearing surface 18 faces towards the second side 19 to capture the bulbous end 13' received in the socket 13. Thus this first bearing surface 18 resists movement of the bulbous end 13' (as well as the respective link assembly 3') out of the socket 15.

Referring to FIG. 10b, the inwardly extending flange 21 may be provided around the socket aperture 23 with the exception of the discontinuity formed by the path of the track 25.

The socket 15 may also include a second arcuate bearing surface 27 that substantially surrounds and faces the main axis 29 (as shown in FIGS. 12d and 12f). This arcuate bearing surface 27 may resist movement of the bulbous end 13' in directions perpendicular to the main axis 29. At the same time, a gap may be provided between these two components which provides a very limited degree of freedom. When in use, although there is tension in assembly, friction between the assembly and ground due to the assembly weight and movement of vehicle results in bending the assembled chain 1. The gap may allow the first member 13 deviates a slightly from an axis of tension to provide some flexibility. The arcuate bearing surface 27 may also allow the bulbous end 13' to freely rotate inside the socket 15.

The track 25 is shaped to allow the bulbous end 13 and shank portion 41 to pass through. In one example, the track 25 is substantially a T-shaped slot. This is best illustrated in FIGS. 10a and 12g. Referring to FIG. 12b, the track 25 has an entry path to the socket 15 that is directed at an angle towards the main axis 29 and the first bearing surface 18 of the socket 15. In some examples, the angle between track path and the first bearing surface 18 (or the perpendicular to the main axis 29) is in the range of 20 to 40 degrees. The entry angle may assist in keeping the bulbous end 13 in the socket 15 during use as tension in the chain will bias the bulbous end 13 towards the first bearing surface 18 (instead of out through the track 25).

In the illustrated example, the track 25 leads to the socket 15 which has a depth (along the main axis 29) greater than the respective length of the bulbous end 13. This forms a pocket for the bulbous end 13 to sit (as shown in FIG. 5c) so that it can bear against the second bearing surface 27 in substantially all directions radial to the main axis. Thus forces in directions perpendicular to the main axis 29 causes the bulbous end 13' to bear against the second bearing surface 27. Referring to FIG. 5c, it is clear that if bulbous end 13' is biased in a direction A, the bulbous end 13' will bear against part of the second bearing surface 27 instead of the opening of the track 25.

The lock 31 includes the lock pin apertures 35 to receive a lock pin 33 to interfere with the track 25. This prevents the first link portion 7 of another link assembly 3' from sliding out of engagement. It is to be appreciated other methods of blocking the track 25 can be used, including a gate or a biased (e.g. spring-loaded) clip.

Referring to FIG. 10b, the lock pin apertures 35 are provided at an intermediate portion of the track 25 (which is a cut out from part of the inwardly extending flange 21'). Therefore in some example, the shank portion 41 of another link assembly 3 may be allowed to partially pass down the track 25 before interruption by the lock pin 33. This may allow limited bend in the chain 1. The bend may depend on factors such geometries of the bulbous end 13, the socket 15, the length of the shank portion 41 in addition to the location of the lock pin apertures 35. In other examples, it may not be desirable to allow limited movement of the shank portion 41 and the lock pin aperture 35 may be located closer towards the socket aperture 23.

The second component 8 also includes a central receptacle 54 along the main axis 29 to receive the projecting portion 51 of the first link portion 7. Fastener receiving passages 57 are provided in the body to receive a fastener 61 passing through both the first and second components 8. In some examples, the fastener receiving passages 57 may be stadium-shaped to allow some relative movement between the first component 6 and second component 8 along the main axis 29. In other examples, the fastener receiving passages 57 may be a triangular shape with radius corners. The triangular shape may allow ease of insertion of the fastener 61 (when the fastener 61 is near the triangular base) during assembly whilst providing a tight fit when assembled (when the fastener 61 is wedged at the apex of the triangle). In yet another example, the fastener receiving passages 57 may be an asymmetrical oval.

The second link portion 9 also includes a clamping portion 28, which may be substantially dish shaped (and with a concave surface), to provide one half of the clamp against the harrow member portion 5. The clamping portion 28 may include one or more protrusions 39 to engage with at least one anti-rotation aperture 53 of the harrow member portion 5. At the opposite side of the clamping portion 28, is a plurality of radially extending support ribs 67. These support ribs 67 assist in maintaining rigidity of the clamping portion 28.

Referring to FIG. 10b, the second component 8 may also include a ribbon 68 at the outer perimeter. The ribbon 68 may be substantially circular and connect the support ribs 67 to one another. The ribbon may increase the rigidity of the clamping portion 28 to reduce bending from back pressure of the harrow member portion 5. The ribbon 68 may also increase longevity of the second component 8 as this increases the material at the periphery of the second component 8 (so that rocks or other debris will need to wear through the ribbon 68 before reaching the ribs 67 and other portions of the second component). The ribbon 68 may also add more mass to the link assembly 3 which may be beneficial for providing increased force of the ground engaging chain to the earth.

It is to be appreciated that the body 16 can be formed with other shapes. The shape and configuration may be designed to increase or decrease the mass of the link assembly 3 as required. Increasing the mass of the link assembly can increase the force that the harrow member portions 5 impart on the ground.

Harrow Member Portion 5

The harrow member portion 5 may include a substantially dish-shaped or disc-shaped body. In the illustrated example, the harrow member portion is dish-shaped with the first side 17 having a concave surface and a second side 19 having a convex surface.

The harrow member portion 5 includes a central aperture 52 allows the first link portion 7 and the second link portion 9 to be interconnected. In this example, this includes passing the projecting portion 51 of the first component 6 through the central aperture 52 and into the receptacle 54 of the second component.

The harrow member portion 5 may also include anti-rotation apertures 53 that engage with other components of the link assembly 3. In one example, this includes engaging with the protrusions 39 of the second link portion 9. This prevents relative rotation of the harrow member portion 5 and other components of that same link assembly 3. This may reduce wear and fatigue on the components. It is to be appreciated that in examples, the first component 6 could be provided with protrusions to engage with the harrow member portion 5. In alternative examples, slots, grooves, or other structural features can be used to engage with the components of the link assembly to prevent relative rotation.

In some examples, the harrow member portion 5 is a resilient member. When the link assembly 3 is assembled, the harrow member portion 5 is elastically deformed between the first component 6 (an in some examples via the clamping subcomponent 22) and the second component 8. The resultant elastic stress in the harrow member portion 5 causes the wall portions of the first and second receiving passages 55, 57 to urge against the fasteners 61 to increase friction between the fastener 61 and the wall portions of the passages 55, 57. This may assist in retention of the fastener 61 and thereby assisting in retaining the components of the link assembly 3 together.

In some examples, the convex surface of the second side 19 of the harrow member portion 19 is a different curvature to the concave surface of the clamping portion 28. This difference in curvature may facilitate elastic deformation of the harrow member portion 5 to provide the biasing forces described above. This is further described in International Patent Application No. PCT/AU2015/050086 filed 3 Mar. 2015 (published as WO 2015/131246) and the contents of that document are incorporated by reference.

Clamping Subcomponent 22

The clamping subcomponent 22, as shown in FIGS. 14*a* to 14*c*, is an intermediate component between the collar 126 of the first component 6 and the harrow member portion 5. The clamping subcomponent 22 may include a convex surface 42 that, when the link assembly 3 is assembled, provides a surface to abut the concave surface of the first side 17 of the harrow member portion 5. A central aperture 30 is provided to allow the projecting portion 51 to pass through. A bearing surface 32 may be provided at the central aperture 30 to abut against the first component 6.

The clamping subcomponent 22 may be sized and shaped for specific shapes and sizes of harrow member portions 5. Thus a clamping subcomponent 22 may be changed for various sizing requirements whilst using the same first component 6. In other examples, the clamping subcomponent 22 may be a wear part that can be replaced without having to replace the first component 6.

Fastener 61

FIGS. 15*a* and 15*b* illustrate a fastener 61 that may be used to fasten components of the link assembly 3 together. The fastener 61 has a central shaft portion 62 with a relatively larger diameter than opposite shaft end portions 64 that have a smaller diameter. When assembled, the central shaft portion 62 is substantially located in the first fastener receiving passage 55 and the opposite end portions 64 are substantially located in the second fastener receiving passages 57.

Assembling the Link Assembly 3

To assemble the link assembly 3, the projecting portion 51 of the first component 6 is passed through the central aperture 40 of the clamping subcomponent 22 and the central aperture 52 of the harrow member portion 5. The projecting portion 51 is then received in the receptacle 54 of the second component 8. The first component 6 may be rotated relative to the second component 8 around the main axis 29 so that the first and second receiving passages 55, 57 are aligned.

In some examples, it may be necessary to apply external forces to urge the first and second components 6, 8 together so that the harrow member portion 5 is clamped and deformed in between. This may align the first and second receiving passages 55, 57 so that the fastener 61 can be inserted into the passages 55, 57. Once the fastener 61 is located, the external forces may be removed and the resilient harrow member portion 5 may apply opposite pressure to the first and second component 6, 8 to assist retention of the fastener 61.

Figure 19A:
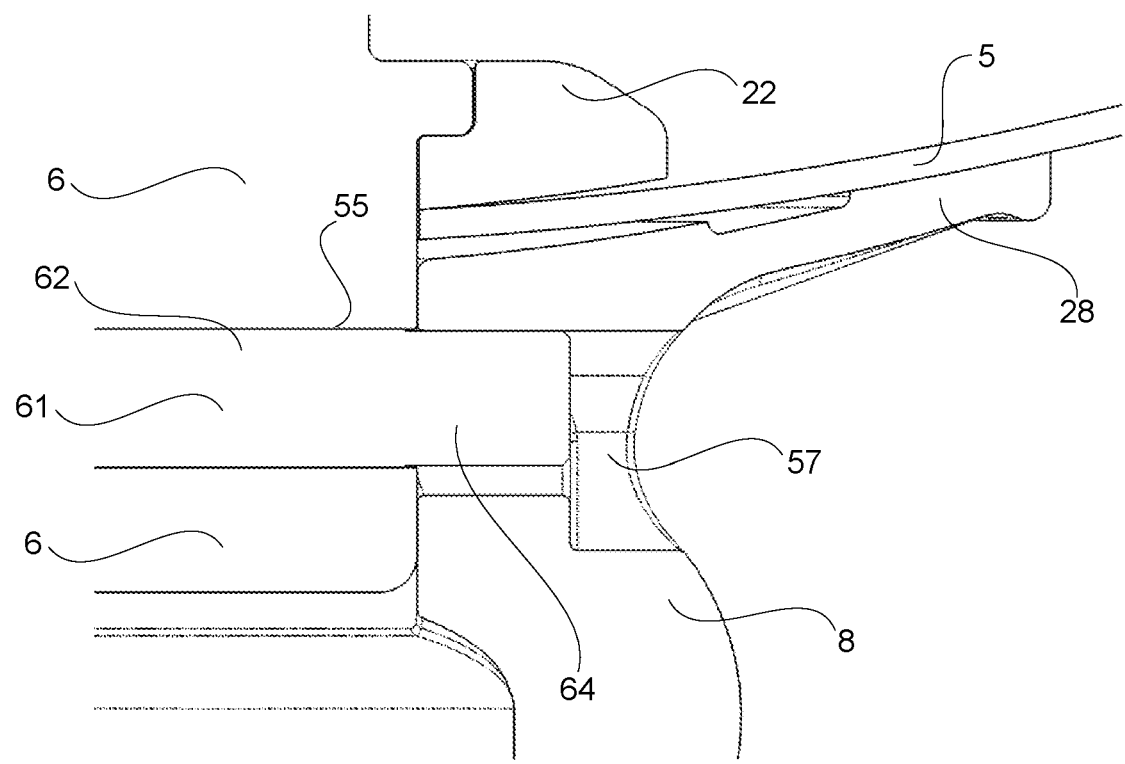
FIG. 19a is a detailed sectioned view of part of the fastener in the fastener receiving passages.
Figure 19B:
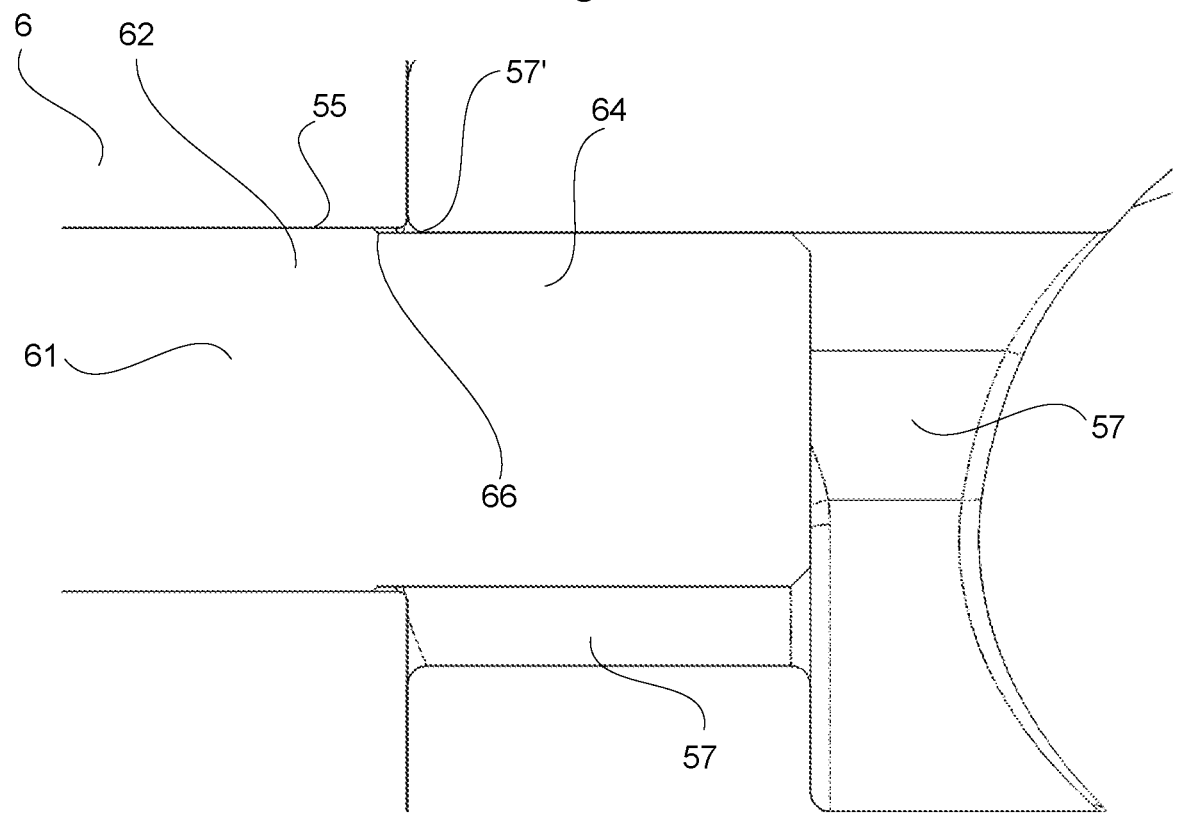
FIG. 19b is a further detailed view of the fastener in FIG. 19b.

Referring to FIGS. 19*a* and 19*b*, the larger diameter of the central shaft portion 62 can function to assist retaining the fastener 61 in the first and second fastener receiving passages 55, 57. In particular, if the fastener 61 pushed axially along the shaft axis, the step 66 between the larger central shaft portion 62 and the end portion 64 will be caught by the edge 57' of the second fastener receiving passage 57. To insert or remove the fastener, this may include providing the external force so that step 66 of the fastener 61 is clear of the edge 57' of the second fastener receiving passage 57.

It is to be appreciated that disassembly of the link assembly 3 may include the above mentioned steps in reverse.

Description of Components in a Second Example

Figure 20:
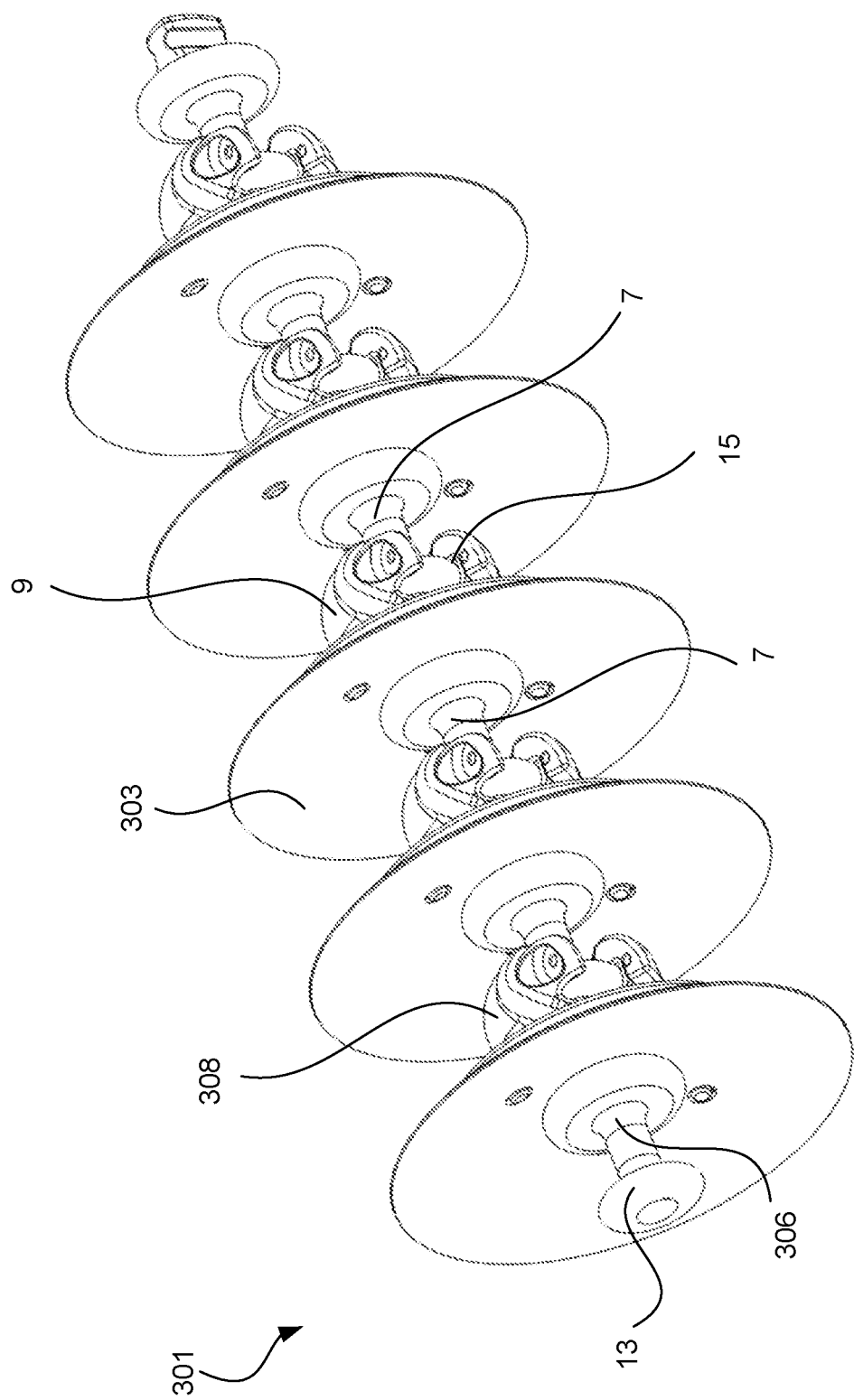
FIG. 20 illustrates a perspective view of a second example of an agricultural ground engaging chain comprising multiple link assemblies.

FIGS. 20 to 22 illustrate a second example of an agricultural ground engaging chain 301. Like the previous example, the chain 301 includes a plurality of link assemblies 303, each having a harrow member portion 5, a first link portion 7, and a second link portion 9. The first link portion 5 includes a bulbous end 13 to be received in a socket 15 of the second link portion 9 of an adjacent link assembly 303.

Figure 25:
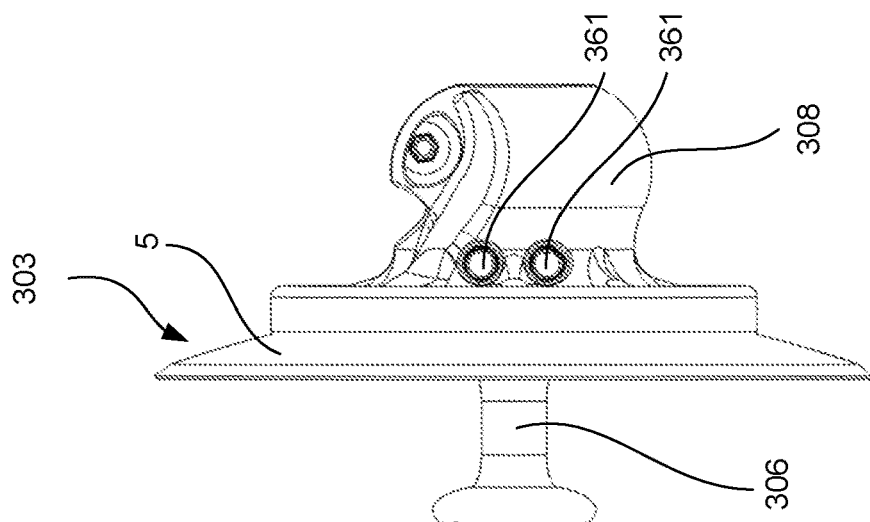
FIG. 25 is a side view of the link assembly in FIG. 23.
Figure 24:
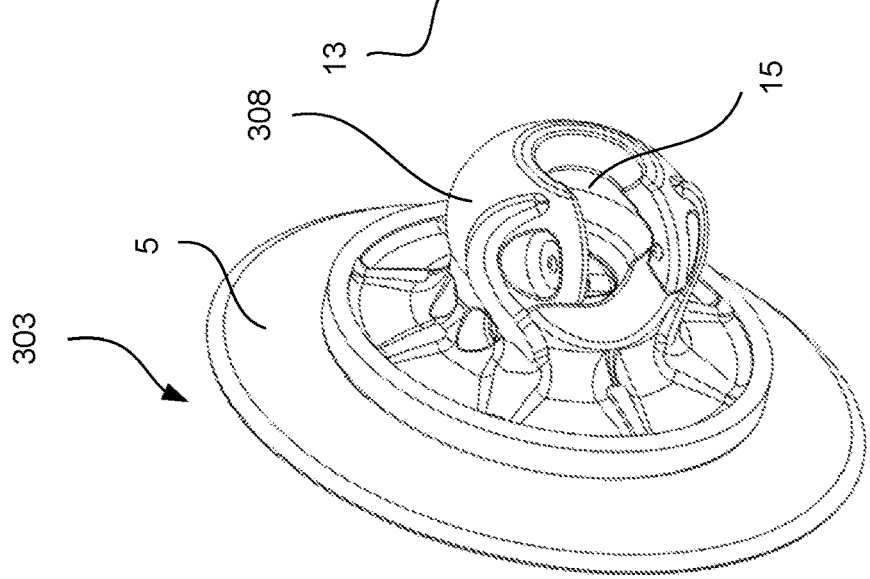
FIG. 24 is a rear perspective view of the link assembly in FIG. 23.
Figure 23:
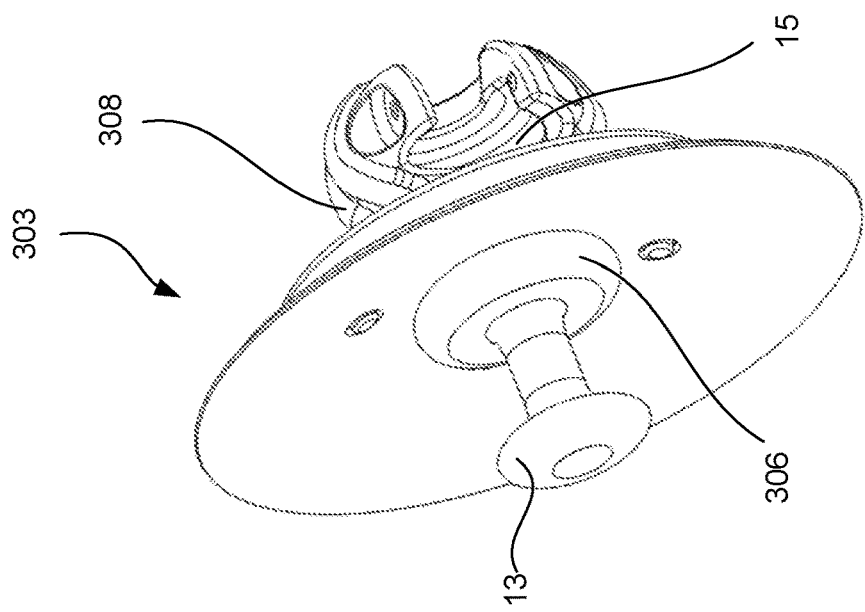
FIG. 23 is a front perspective view of a link assembly in the agricultural ground engaging chain in FIG. 20.
Figure 28A:
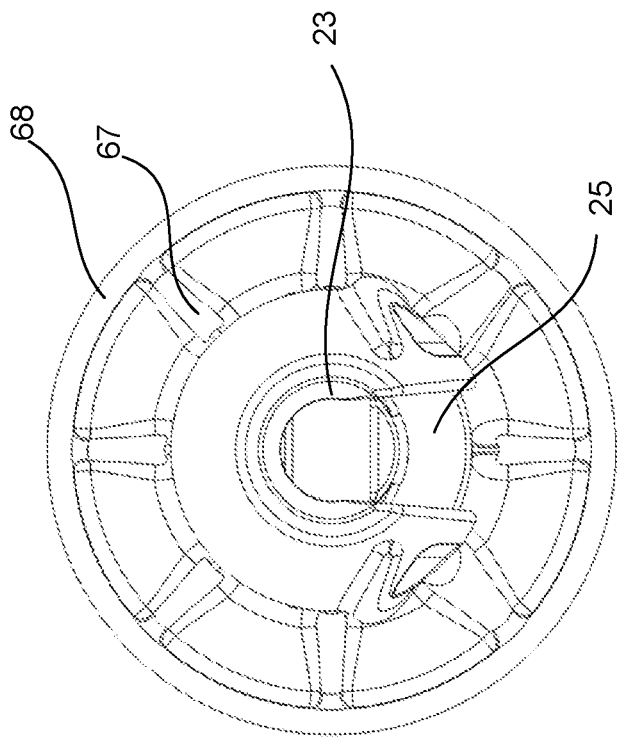
FIGS. 28a to 28d illustrate front, rear, top and side views of the second component in the link assembly in FIG. 23.
Figure 28B:
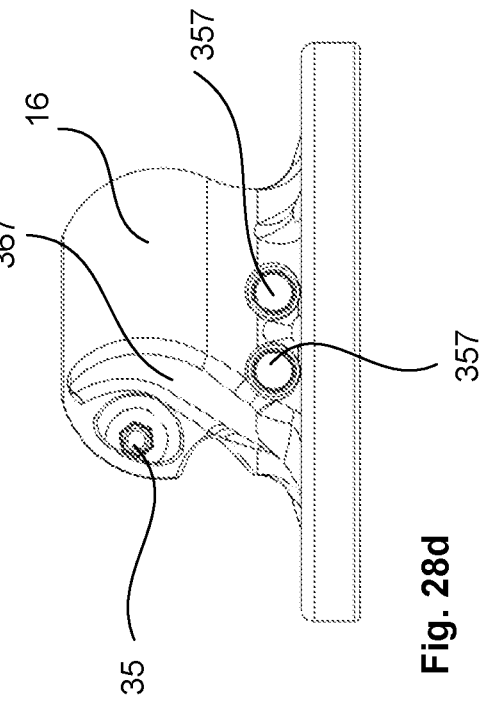
Figure 28C:
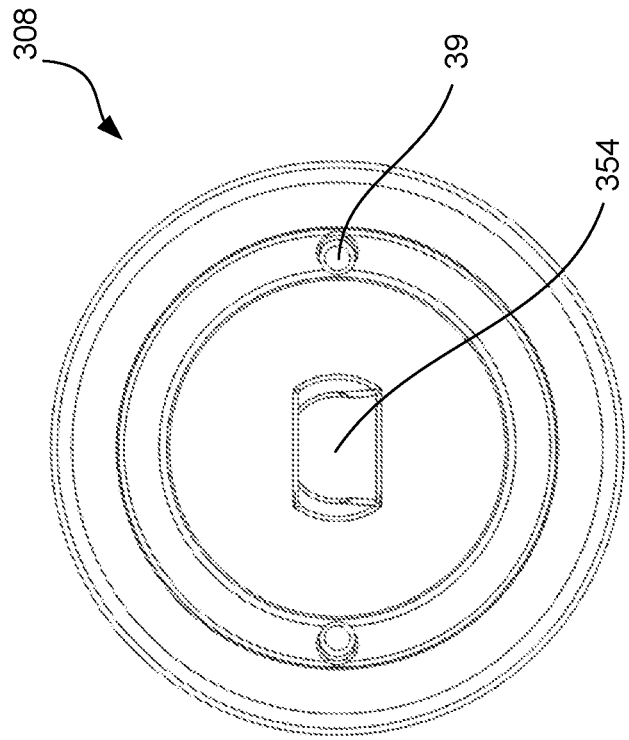
Figure 28D:
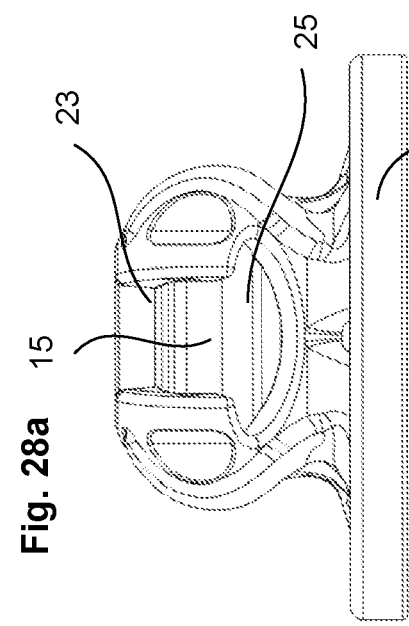

The key differences in the second example of the link assembly 303 as shown in FIGS. 23 to 25, in contrast to the link assembly 3 described above, are specific the configurations of the first component 306 and second component 308. Furthermore, the features of the clamping subcomponent 22 are incorporated with the first component 306. In addition, two fasteners 361 are provided to fasten the components of the link assembly 303 together. The various features of the second example will be described in further detail below. For brevity, other features that are common with the first example will not be repeated and it is to be understood that such earlier described features, to the extent feasible, can be applied to the second example.

First Component 306 of the Second Example

FIGS. 26*a* to 26*d* illustrate the first component 306 having a first link portion 7 with a narrow shank portion 41 leading to the bulbous end 13. At the opposite end to the bulbous end 13 and shank portion 41 is a projecting portion 351. In this example, the projecting portion 351 may have a substantially rectangular cross-section that can be inserted into a corresponding central receptacle 354 of the second component 308. The substantially rectangular cross-section may assist in alignment of the projecting portion 351 and the central receptacle 354. In some examples, the substantially rectangular cross-section may include one or more outer perimeters that have a curvature and/or chamfer. In some examples, the substantially rectangular cross-section may be a stadium shape. This may be formed by providing cutting a pair of opposite (and parallel) flat surfaces on the curved sides of a cylindrical projecting portion.

The skilled person will appreciate avoiding sharp edges and corners may be for manufacturing and/or structural reasons. It is to be appreciated that in other examples, the cross-section of the projecting portion 351 may be other shapes, such as triangular, square, parallelogram, pentagonal, hexagonal, other polygonal shapes, star, ellipse, circular, etc.

Instead of a fastener receiving passage 55 in the form of an aperture, as provided in the earlier examples, the projecting portion 351 has a pair of transversely extending grooves 356. These grooves 256 extend substantially perpendicular to the axis 43 of the shank portion 41. These grooves receive, at least in part, the fasteners 361 to fasten the first component 306 to the second component 308. Importantly, the transversely extending grooves 356 increase the area under shear load of the fastener 361 during use, which assist in retaining the components together. This will be described in further detail below with reference to FIG. 31.

Instead of a combination of a collar 126 and the clamping subcomponent 22, the first component 306 in the second example has a large clamping collar 322 to perform this function. In particular, having surface 342 to clamp against the concave surface of the first side 17 of the harrow member portion 5. The large clamping collar 322 may be integrally formed in the first component 306 with the other features.

The bulbous end 13 also has a flat surface 344. This flat surface may be used during the assembly process by providing a flat bearing surface 344 when pushing the first component 306 towards the second component 308.

Second Component 308 of the Second Example

FIGS. 27a to 28d illustrate the second component 308 having a second link portion 9 for locating on the second side 19 of the harrow member portion 5. The second link portion 9 includes a body 16 having a socket 15 to receive the bulbous end from another link assembly 303.

The second component 8 includes a central receptacle 354 that is shaped to receive the projecting portion 351. A pair of fastener receiving passages 357 are provided in the body 16 to receive fasteners 361 passing through the second component 308 and into the transversely extending grooves 356 of the first component 306. The fastener receiving passages 357 also extend to internal transversely extending grooves 358 that face towards the central receptacle 354 as illustrated in FIG. 27a. These internal transversely extending grooves 358 may have a length matching the transversely extending grooves 356 of the first component 306.

In this example, the pair of fastener receiving passages 357 are substantially circular and located to coincide with the grooves 356 in the first component 306. It is to be appreciated that the shape of the central receptacle 354 and corresponding projecting portion 351 may be correspondingly shaped such that as the projecting portion 351 is inserted, the fastener receiving passages 357 and internal transversely extending grooves 358 are aligned to the grooves 356 of the projecting portion 351.

Additional support ribs 367 are provided on the body 16 of the second component 208 to increase the strength of the link assembly 303 under load.

Fastener 361

FIGS. 29a and 29b illustrate a fastener 361 that may be used to fasten components of the link assembly 303 together. Unlike the fastener 61 described above, this fastener has a central shaft portion 362 that has a relatively smaller diameter than the opposite shaft end portions 364 with a larger diameter. When assembled, the central shaft portion, at least in part, abuts the transversely extending grooves 356, 358. The opposite shaft end portions 364 are, at least in part, located in the fastener receiving passages 357. The difference in diameter may assist retention of the fastener 361 in the link assembly 303.

Figure 30B:
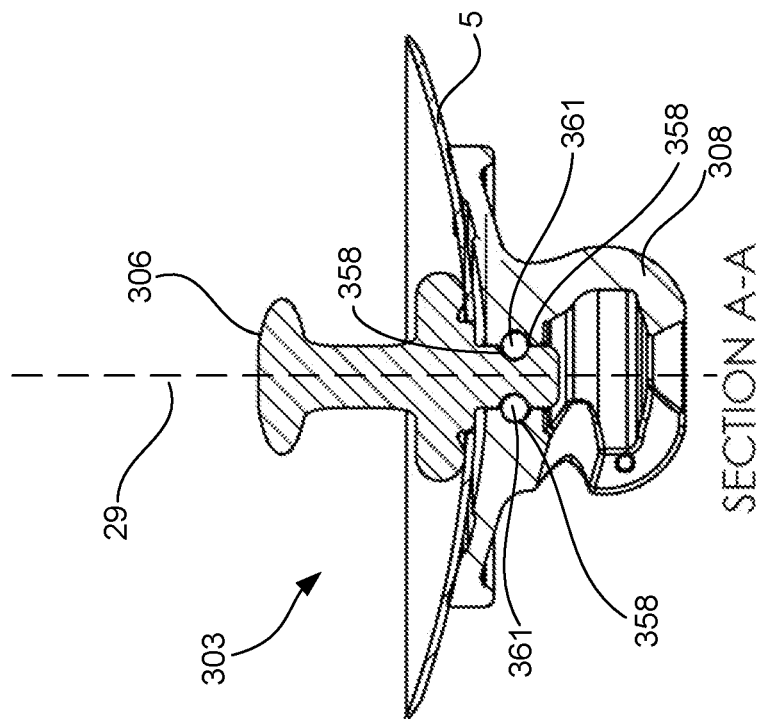
FIG. 30b illustrates a sectioned view of the link assembly illustrated in FIG. 30 along section A-A.
Figure 30A:
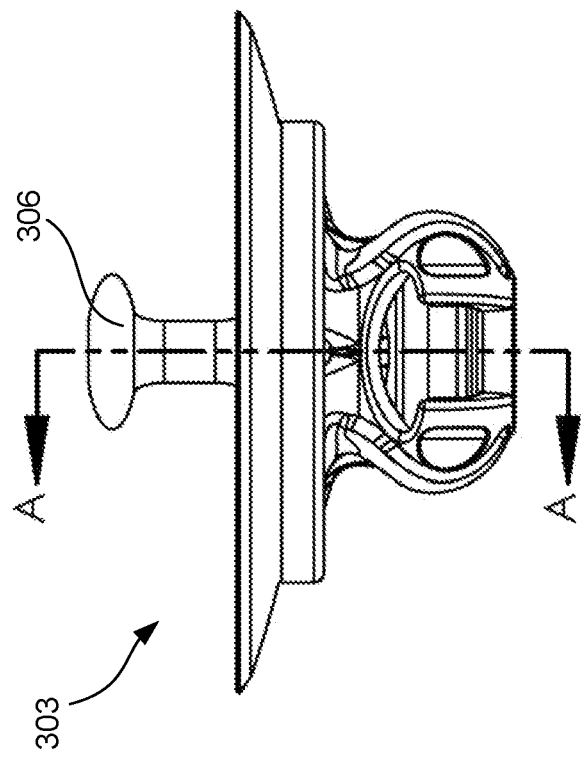
FIG. 30a illustrates a top view of the link assembly in FIG. 23.
Figure 31:
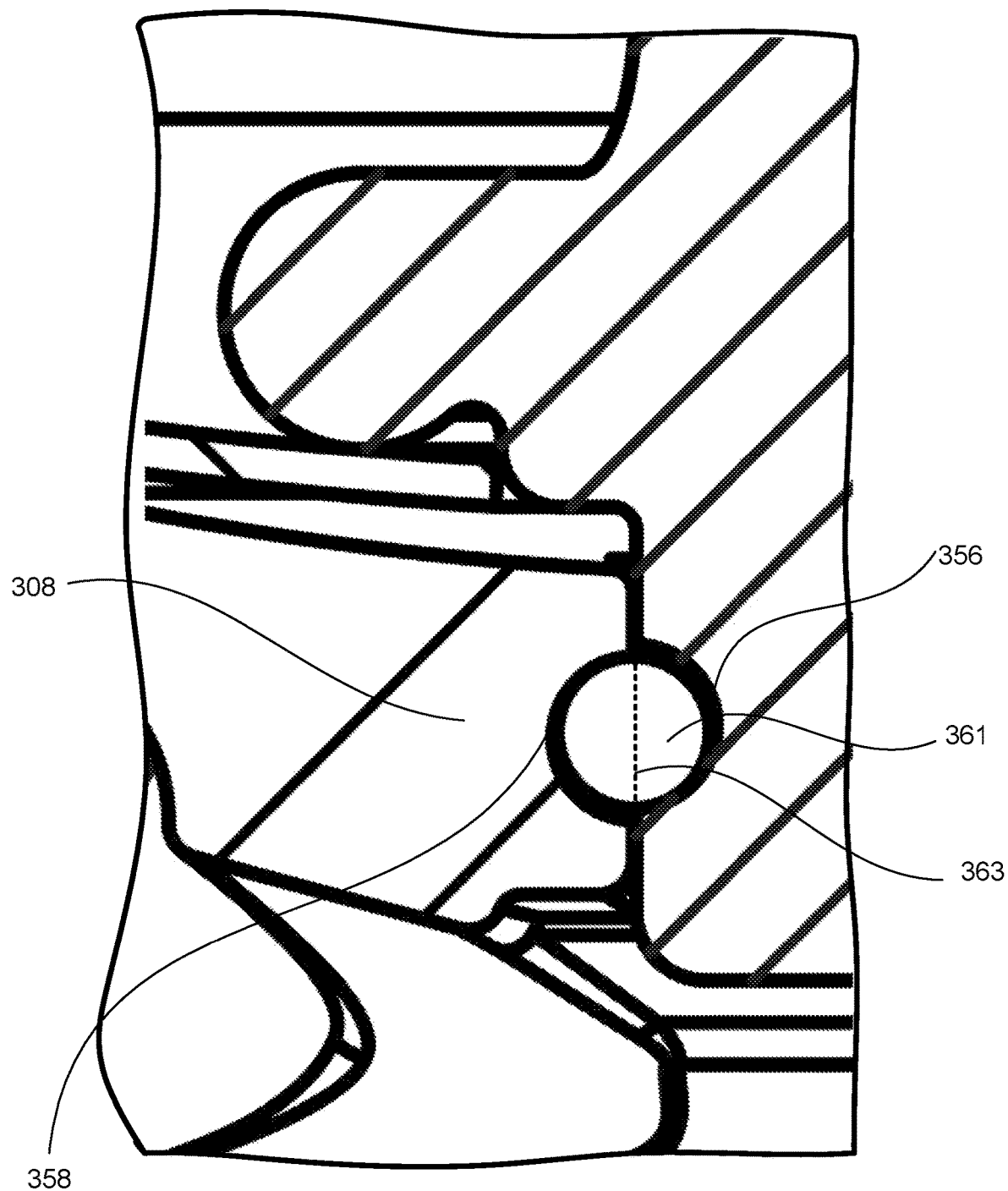
FIG. 31 illustrates an enlarged portion of the sectioned view in FIG. 30b to show the relationship of the fastener with the first component and the second component in the link assembly.

The area of shear on the fastener 361 in the assembled link assembly 303 will now be described with reference to FIGS. 30a to 31. The first component 306 and second component 308 are under forces to separate from one another along main axis 29. This is due firstly to the resilient harrow member portion 5 that may force the clamping portion 28 away from surface 342 of the first component 306. Secondly, the agricultural ground engaging chain 301 itself may be under tension during use. To resist this force, the fasteners 361 are under stress, in particular shear stress along plane 363 as shown in FIG. 31. The area that each fasteners 361 is under shear stress is approximately the diameter of the fastener 361 multiplied by the length of the transversely extending groove 356. Thus in the assembled link assembly 303, with two fasteners 361, such shear forces are taken by double this area. Such a configuration has the advantage of spreading the forces to a greater area of the fastener 361 which may increase the load that the link assembly 303 can handle during use.

Assembling the Link Assembly 303 and Agricultural Ground Engaging Chain 301

To assemble the link assembly 303, the projecting portion 351 of the first component 306 is passed through the central aperture 52 of the harrow member portion 5. The projecting portion 351 is then received in the central receptacle 354 of the second component 308. External forces may be applied to urge the first and second components 306, 308 together to clamp and deform the harrow member portion 5 until the transversely extending grooves 356 of the first portion 351 are aligned with the fastener receiving passages 357. The fasteners 361, which may be in the form of pins (or bolts), are then passed through the fastener receiving passages 357 and into the grooves 356, 358. The external forces can be released and the resilient harrow member portion 5 may apply pressure to the first and second components 306, 308 to assist retention of the fastener 361.

Figure 32A:
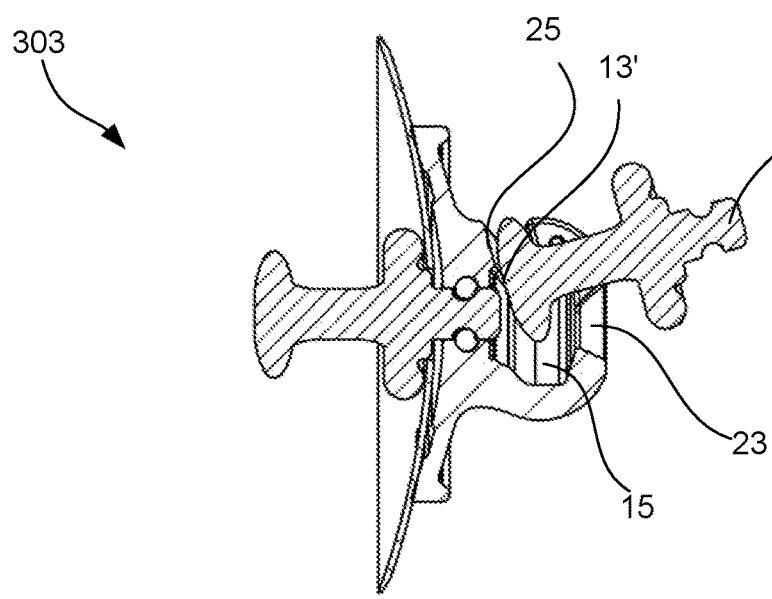
FIGS. 32a to 32c illustrate a sectioned side view, a top perspective view, and an alternative top perspective view of a bulbous end of a first component being inserted into a track of a link assembly of FIG. 23.
Figure 32B:
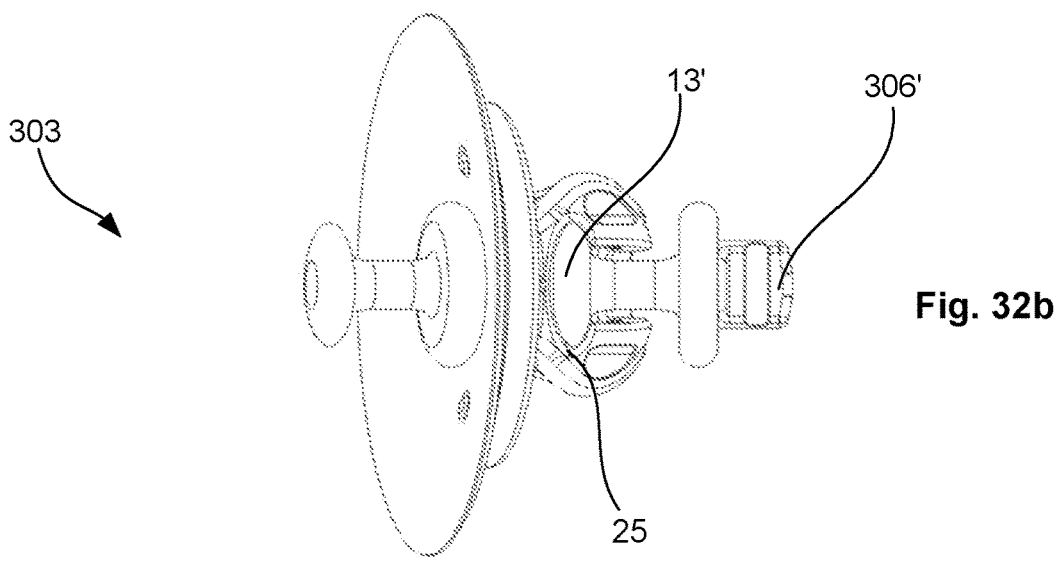
Figure 32C:
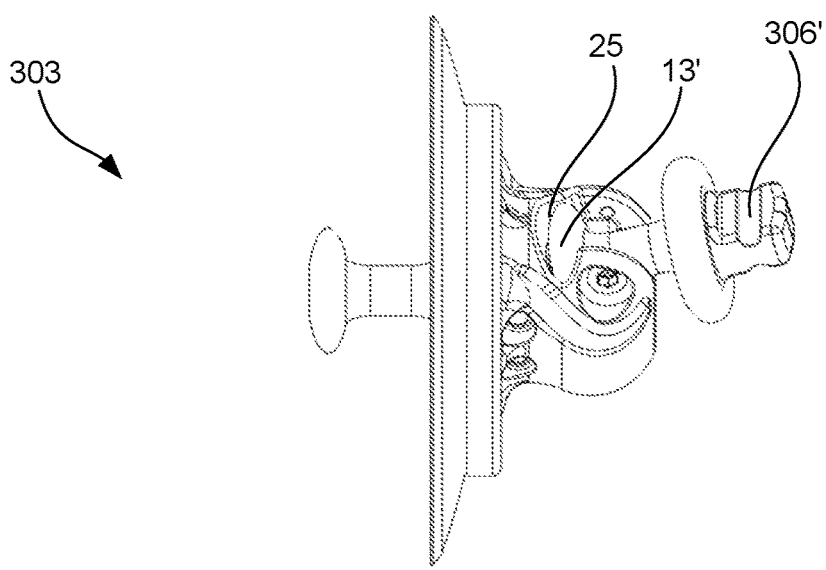
Figure 33A:
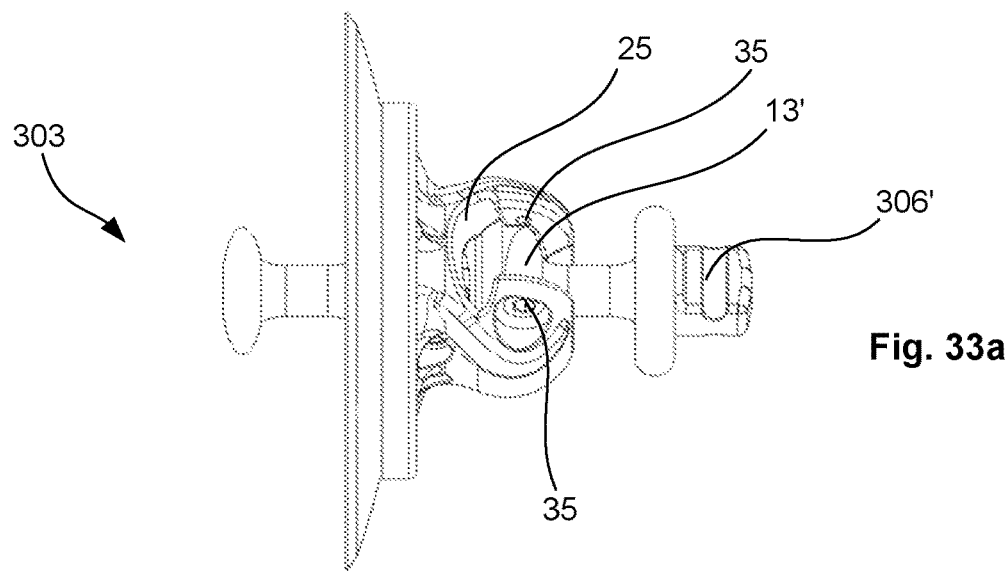
FIG. 33a illustrates a bulbous end of a first component inside a cavity of the link assembly if FIG. 23.

FIGS. 32a to 32c illustrate a first component 306' of one link assembly (other components not shown for clarity) in the process of insertion into the cavity 15 of another link assembly 303. In particular, the bulbous end 13' is inserted into the track 25 which is shaped to receive the bulbous end as best illustrated in FIG. 32b. Once the bulbous end 13 is inserted and seated in the cavity 15, as illustrated in FIG. 33a, a lock pin 33 many be inserted through the lock pin apertures 35 to retain the first component 306'. This method of assembling multiple link assemblies 303 together is substantially the same as described above for assembling the first example of link assemblies 3.

Figure 33B:
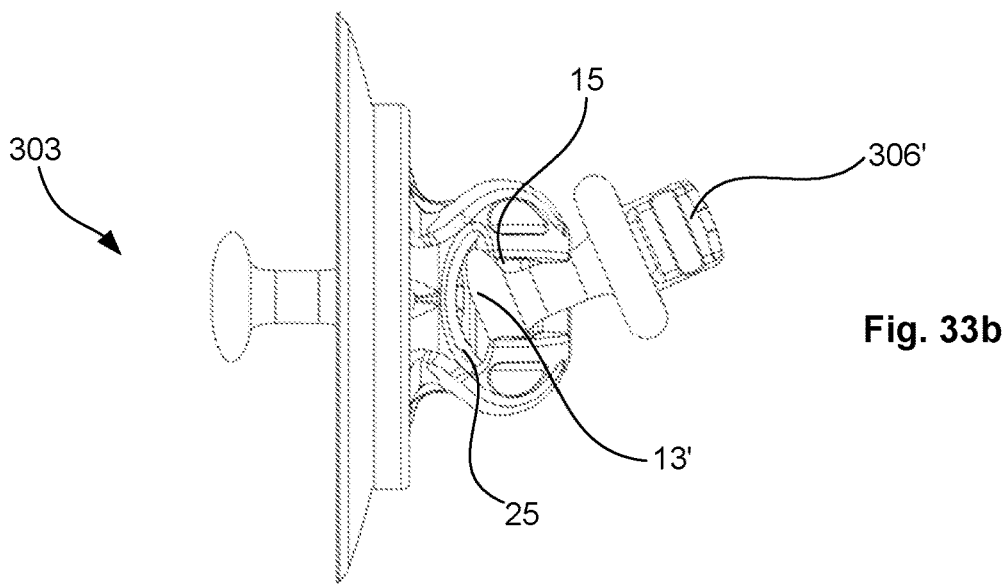
FIG. 33b illustrates the first component that is tilted relative to the link assembly of FIG. 23.
Figure 33C:
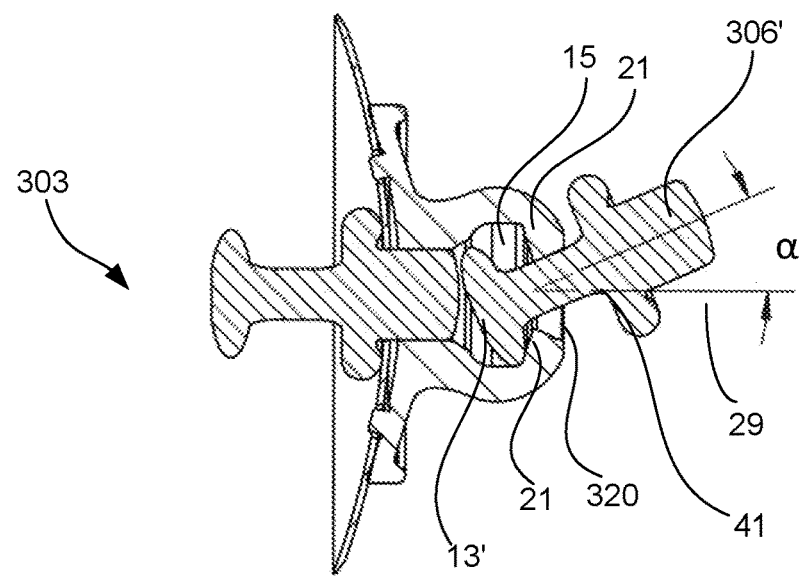
FIG. 33c illustrates a sectioned view of the first component and link assembly in FIG. 33b.

FIGS. 33b and 33c illustrate the first component 306' tilting relative to the link assembly 303. This is representative of how link assemblies 303 in the agricultural ground engaging chain 301 can articulate relative to one another. This may be useful during transportation and storage to provide a more compact footprint. Referring to FIG. 33c, the inwardly extending flange 21 has a bevelled edge 320 to allow the narrow shank portion 41' limited movement relative to the main axis 29. FIG. 33c shows this range of movement which includes up to $\alpha$ degrees from the main axis 29. In some examples, $\alpha$ may be between 5 to 30 degrees, and in more specific examples between 20 to 30 degrees. In some specific examples, $\alpha$ may be approximately 23 degrees. It is to be appreciated this range of movement many include a deviation of $\alpha$ in all directions from the main axis 29.

Link System 203

FIGS. 16a to 17 illustrate an example of a link system 203. The link system 203 may be used for selectively linking two elements to one another. In some examples, this may include linking a rope, cable, or a rigid element to another element. Thus the link system 203 may be used as a shackle to join elements to one another.

The link system 203 includes a first link portion 207 fixed to the first element 204. The first link portion 207 includes a bulbous end 13 and may share similar characteristics to the first link portion 7 described above.

The link system 203 also includes a second link portion 207 fixed to the second element 206. The second link portion 207 includes a socket 15 and track 25 similar to the second link portion 9 described above. The socket 15 has a bearing surface 19 formed by inwardly extending flanges 21 around a socket aperture 23 so that the bulbous end 13 of the first link portion 207 can be received and captured therein (see sequence from FIGS. 16a to 16b). A lock pin 33 may then be inserted to lock the first link portion 207.

The link system 203 may be used in a variety of applications. In some examples, the link system may be used as part of a tow rope system for vehicles. The first link portion 207 may be attached to a tow rope and the second link portion 207 may be fixed to a vehicle chassis. This may allow easy connection and disconnection between vehicles. In other examples, this may be used with anchoring or mooring cables. In yet other examples, the link system 203 may be used for securing anchor cables for structures such has buildings, antennas, bridges, etc.

Variations

In the above example of the link assembly for an agricultural ground engaging chain 1, each link assembly includes separable harrow member portion 5, first component 6 and second component 8. However in some variations, one or more of these components may permanently joined to another component or integrally formed with another component.

The lock 31 described above includes passing a lock pin 33 through apertures 35. In some examples, this may be a solid pin. In alternative examples, this may include using a spring pin (a.k.a. tension pin or roll pin). Alternative variations of the lock 31 may include a gate that can open and close the track 25.

In variations, the socket aperture 23 and socket 15 may be sized larger than the shank portion 41 and bulbous end 13. A larger size may provide additional clearance to facilitate insertion and extraction in a dirty and dusty environment so that the components do not bind. Furthermore, additional clearance may provide some relative movement (in particular rotation) so that the ground engaging chain 1 can bend.

In the above example, the projecting portion 51 is an extension from the first component 6. It is to be appreciated that in alternative examples, the projecting portion may be an extension of the second component 8 to be received in a receptacle of the first component 6.

In some alternative examples, the projecting portion 51 may be threaded to be received in a threaded receptacle.

In some examples, the spacing between the harrow member portions 5 may be adjusted by specifying the length of the shank portion 41.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A link assembly for an agricultural ground engaging chain including a plurality of link assemblies, the link assembly comprising:
    a harrow member having opposite first and second sides;
    a first link portion at the first side of the harrow member, the first link portion including a bulbous end; and
    a second link portion at the second side of the harrow member, the second link portion including a socket,
    wherein to link with adjacent link assemblies, the bulbous end is received in a respective socket of an adjacent link assembly and the socket receives a respective bulbous end of another adjacent link assembly,
    wherein the second link portion includes at a first bearing surface to define, at least in part, the socket and wherein at least a portion of the first bearing surface faces towards the second side of the harrow member portion,
    wherein when the respective bulbous end is received in the socket, the first bearing surface engages the respective bulbous end to resist movement of the respective bulbous end in a direction away from the second side.

2. The link assembly according to claim 1 wherein the first bearing surface is formed from an inwardly extending flange around a socket aperture of the socket.

3. The link assembly according to claim 1 wherein the second link portion further comprises a track to allow insertion of the respective bulbous end into the socket.

4. The link assembly according to claim 3 wherein the track includes a substantially T-shaped slot.

5. The link assembly according to claim 3 wherein the track has an entry path to the socket that is between 20 to 40 degrees relative to the first bearing surface.

6. The link assembly according to claim 3 further comprising a lock, wherein the lock selectively engages the track to retain the respective bulbous end in the socket.

7. The link assembly according to claim 6 wherein the lock comprises at least one lock pin and wherein the second link portion comprises at least one lock pin aperture, wherein the lock pin is inserted through the lock pin aperture to block passage of the first link portion through the track.

8. The link assembly according to claim 1 wherein the socket comprises an arcuate second bearing surface facing a main axis of the link assembly to resist movement of the respective bulbous end in directions perpendicular to the main axis.

9. The link assembly according to claim 1 wherein the first link portion comprises a shank portion extending from the first side to the bulbous end.

10. The link assembly according to claim 9 wherein the shank portion extends along a shank portion axis and the bulbous end is substantially symmetrical around the shank portion axis, wherein the bulbous end is rotatable around the shank portion axis inside the respective socket of an adjacent link assembly.

11. The link assembly according to claim 1 wherein the harrow member includes an anti-rotation aperture, wherein the anti-rotation aperture engages with at least one other component of the link assembly to prevent relative rotation of the harrow member and the at least one other component wherein the second link portion includes at least one protrusion to engage with at least one anti-rotation aperture.

12. The link assembly according to claim 1, wherein the harrow member portion includes a central aperture, wherein the first link portion and second link portion are interconnected through the central aperture, wherein the first link portion is part of a first component and the second link portion is part of a second component, the first component including a projecting portion opposite the first link portion, the second component including a receptacle, wherein the first component passes through the central aperture of the harrow member to be received in the receptacle of the second component.

13. The link assembly according to claim 12 wherein the projecting portion has at least one first fastener receiving passage and the second component has at least one second fastener receiving passage, wherein a fastener passes through the first and second fastener receiving passages.

14. The link assembly according to claim 13 wherein the harrow member portion is a resilient member, wherein when assembled the harrow member portion is elastically deformed between the first component and the second component such that the resultant elastic stress in the harrow member portion causes wall portions of the first and second receiving passages to urge against the fastener increasing friction between the wall portions of the first and second receiving passages and fastener.

15. The link assembly according to claim 1 wherein the second link portion further comprises a plurality of radially extending support ribs.

16. The link assembly according to claim 15 further comprising a ribbon extending around an outer perimeter of the second link portion.

17. An agricultural ground engaging chain including a plurality of link assemblies according to claim 1.

18. A link system to link a first element to a second element, the link system comprising:
- a first link portion fixed to the first element, the first link portion including a bulbous end;
- a second link portion fixed to the second element, the second link portion comprising:
- a socket having a first bearing surface formed by inwardly extending flanges around a socket aperture, wherein the bulbous end is received in the socket and the first bearing surface engages the bulbous end to resist movement in opposite directions along a main axis between the first link portion and second link portion; and
- a track for insertion of the bulbous end into the socket.

19. The link system according to claim 18 wherein the track has an entry path to the socket that is between 20 to 40 degrees relative to the first bearing surface.

* * * * *